US008600836B2

(12) United States Patent
Collins

(10) Patent No.: US 8,600,836 B2
(45) Date of Patent: Dec. 3, 2013

(54) SYSTEM FOR DISTRIBUTING PACKAGES AND CHANNELS TO A DEVICE

(75) Inventor: Bruce Collins, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1049 days.

(21) Appl. No.: 11/270,167

(22) Filed: Nov. 8, 2005

(65) Prior Publication Data

US 2007/0106522 A1 May 10, 2007

(51) Int. Cl.
G06Q 99/00 (2006.01)
H04N 5/445 (2011.01)
G06Q 30/00 (2012.01)

(52) U.S. Cl.
USPC .......................................... 705/27.1; 725/44

(58) Field of Classification Search
USPC ........ 705/26, 27, 54, 500, 26.1, 27.1; 725/44, 725/47, 60, 61
See application file for complete search history.

(56) References Cited

U.S. PATENT DOCUMENTS

| | | | |
|---|---|---|---|
| 4,600,921 A | 7/1986 | Thomas | |
| 5,491,774 A | 2/1996 | Norris et al. | |
| 5,604,528 A | 2/1997 | Edward et al. | |
| 5,652,759 A * | 7/1997 | Stringfellow, Jr. | 370/522 |
| 5,659,350 A | 8/1997 | Hendricks et al. | |
| 5,696,500 A | 12/1997 | Diem | |
| 5,717,923 A | 2/1998 | Dedrick | |
| 5,805,763 A | 9/1998 | Lawler et al. | |
| 5,978,649 A | 11/1999 | Kahn | |
| 6,016,141 A * | 1/2000 | Knudson et al. | 715/721 |
| 6,075,526 A | 6/2000 | Rothmuller | |
| 6,088,722 A * | 7/2000 | Herz et al. | 709/217 |
| 6,122,658 A | 9/2000 | Chaddha | |
| 6,230,203 B1 * | 5/2001 | Koperda et al. | 709/229 |
| 6,314,573 B1 | 11/2001 | Gordon et al. | |
| 6,477,707 B1 | 11/2002 | King et al. | |
| 6,505,347 B1 | 1/2003 | Kaneko et al. | |
| 6,536,041 B1 | 3/2003 | Knudson et al. | |
| 6,614,573 B1 | 9/2003 | Cao | |
| 6,654,423 B2 | 11/2003 | Jeong et al. | |
| 6,671,853 B1 | 12/2003 | Burkett et al. | |
| 6,678,215 B1 | 1/2004 | Treyz et al. | |
| 6,729,929 B1 | 5/2004 | Sayers et al. | |

(Continued)

FOREIGN PATENT DOCUMENTS

CA 2548227 A1 6/2005
CN 1212577 A 3/1999

(Continued)

OTHER PUBLICATIONS

Miller, A.L., "Cable Company Changes Channels Prestige Offers Cheaper Service," Baltimore Morning Sun, CAR edition, p. 8B, Oct. 21, 1992.*

(Continued)

*Primary Examiner* — Nicholas D Rosen
(74) *Attorney, Agent, or Firm* — The Marbury Law Group, PLLC

(57) ABSTRACT

A system for distributing packages and channels to a device includes associating weights with the packages and channels. The default ordering of packages on a device display and the default ordering of channels on a program guide is determined according to the weights. In addition, the weights may be used to differentiate functions and conditions that apply to packages and channels.

39 Claims, 11 Drawing Sheets

(56) References Cited

U.S. PATENT DOCUMENTS

| | | |
|---|---|---|
| 6,760,916 B2 | 7/2004 | Holtz et al. |
| 6,785,551 B1 | 8/2004 | Richard |
| 6,857,012 B2 | 2/2005 | Sim et al. |
| 6,863,557 B2 | 3/2005 | Mills et al. |
| 6,886,017 B1 | 4/2005 | Jackson et al. |
| 6,895,486 B2 | 5/2005 | Wong et al. |
| 6,918,132 B2 * | 7/2005 | Gargi .............................. 725/45 |
| 6,983,327 B2 | 1/2006 | Koperda et al. |
| 7,003,117 B2 | 2/2006 | Kacker et al. |
| 7,017,174 B1 | 3/2006 | Sheedy |
| 7,043,225 B1 | 5/2006 | Patel et al. |
| 7,053,958 B2 | 5/2006 | Collins et al. |
| 7,085,291 B2 | 8/2006 | Zhang et al. |
| 7,093,754 B2 | 8/2006 | Sako |
| 7,117,439 B2 | 10/2006 | Barrett et al. |
| 7,120,932 B2 | 10/2006 | Lockhart et al. |
| 7,149,189 B2 | 12/2006 | Huntington |
| 7,194,756 B2 | 3/2007 | Addington et al. |
| 7,257,634 B2 | 8/2007 | Colby et al. |
| 7,305,074 B2 | 12/2007 | Hartung et al. |
| 7,376,964 B1 | 5/2008 | Kim |
| 7,386,871 B1 | 6/2008 | Knudson et al. |
| 7,424,708 B2 | 9/2008 | Andersson et al. |
| 7,506,262 B2 | 3/2009 | Gupta |
| 7,565,506 B2 | 7/2009 | Chen et al. |
| 7,600,245 B2 | 10/2009 | Steading et al. |
| 7,620,574 B2 | 11/2009 | Buehl |
| 7,830,833 B2 * | 11/2010 | Walker et al. ................. 370/329 |
| 8,171,250 B2 | 5/2012 | Chen et al. |
| 2001/0037238 A1 | 11/2001 | Gotoh et al. |
| 2001/0052133 A1 | 12/2001 | Pack et al. |
| 2002/0016801 A1 | 2/2002 | Reiley et al. |
| 2002/0042915 A1 | 4/2002 | Kubischta et al. |
| 2002/0054146 A1 | 5/2002 | Fukumoto et al. |
| 2002/0059603 A1 | 5/2002 | Kelts |
| 2002/0124259 A1 | 9/2002 | Chang et al. |
| 2002/0144291 A1 | 10/2002 | Smiley et al. |
| 2002/0157002 A1 | 10/2002 | Messerges et al. |
| 2002/0188663 A1 * | 12/2002 | Islam et al. ................... 709/202 |
| 2002/0194599 A1 | 12/2002 | Mountain |
| 2003/0037331 A1 | 2/2003 | Lee |
| 2003/0040850 A1 * | 2/2003 | Najmi et al. ....................... 701/1 |
| 2003/0069881 A1 | 4/2003 | Huttunen |
| 2003/0072257 A1 | 4/2003 | Ikedo et al. |
| 2003/0100326 A1 | 5/2003 | Grube et al. |
| 2003/0110297 A1 | 6/2003 | Tabatabai et al. |
| 2003/0117445 A1 | 6/2003 | Hendricks et al. |
| 2003/0154492 A1 | 8/2003 | Falvo et al. |
| 2003/0187916 A1 | 10/2003 | Dettinger et al. |
| 2003/0189587 A1 | 10/2003 | White et al. |
| 2003/0191816 A1 | 10/2003 | Landress et al. |
| 2003/0212999 A1 | 11/2003 | Cai |
| 2003/0226151 A1 | 12/2003 | Hamada et al. |
| 2003/0233561 A1 | 12/2003 | Ganesan et al. |
| 2004/0003405 A1 * | 1/2004 | Boston et al. .................... 725/58 |
| 2004/0024809 A1 | 2/2004 | Edwards et al. |
| 2004/0025179 A1 | 2/2004 | Russ et al. |
| 2004/0028049 A1 | 2/2004 | Wan |
| 2004/0031049 A1 | 2/2004 | Suzuki |
| 2004/0039916 A1 | 2/2004 | Aldis et al. |
| 2004/0040039 A1 | 2/2004 | Bernier |
| 2004/0043763 A1 | 3/2004 | Minear et al. |
| 2004/0048503 A1 | 3/2004 | Mills et al. |
| 2004/0083492 A1 | 4/2004 | Goode et al. |
| 2004/0117822 A1 | 6/2004 | Karaoguz et al. |
| 2004/0117831 A1 | 6/2004 | Ellis et al. |
| 2004/0117857 A1 | 6/2004 | Bisdikian et al. |
| 2004/0153547 A1 | 8/2004 | Trossen |
| 2004/0177383 A1 | 9/2004 | Martinolich et al. |
| 2004/0193545 A1 | 9/2004 | Shlasky |
| 2004/0194135 A1 | 9/2004 | Kahn |
| 2004/0216158 A1 * | 10/2004 | Blas ................................. 725/46 |
| 2004/0226048 A1 | 11/2004 | Alpert et al. |
| 2004/0236854 A1 | 11/2004 | Roy |
| 2004/0261114 A1 | 12/2004 | Addington et al. |
| 2004/0268420 A1 | 12/2004 | Addington et al. |
| 2005/0010653 A1 | 1/2005 | McCanne |
| 2005/0015765 A1 | 1/2005 | Covell et al. |
| 2005/0015803 A1 | 1/2005 | Macrae et al. |
| 2005/0015804 A1 | 1/2005 | Lajoie et al. |
| 2005/0078677 A1 | 4/2005 | Benting et al. |
| 2005/0085183 A1 | 4/2005 | Lee |
| 2005/0090235 A1 | 4/2005 | Vermola et al. |
| 2005/0108770 A1 | 5/2005 | Karaoguz et al. |
| 2005/0120369 A1 | 6/2005 | Matz |
| 2005/0132207 A1 | 6/2005 | Mourad |
| 2005/0154679 A1 | 7/2005 | Bielak |
| 2005/0160456 A1 | 7/2005 | Moskowitz |
| 2005/0160465 A1 | 7/2005 | Walker |
| 2005/0182852 A1 | 8/2005 | Tinsley et al. |
| 2005/0188403 A1 | 8/2005 | Kotzin |
| 2005/0244148 A1 | 11/2005 | Tsumagari et al. |
| 2005/0264704 A1 | 12/2005 | Leinonen |
| 2005/0276246 A1 | 12/2005 | Walker et al. |
| 2006/0031882 A1 | 2/2006 | Swix et al. |
| 2006/0059045 A1 | 3/2006 | Babbar |
| 2006/0095410 A1 | 5/2006 | Ostrover |
| 2006/0107282 A1 | 5/2006 | De Heer |
| 2006/0112182 A1 | 5/2006 | Chen et al. |
| 2006/0136905 A1 | 6/2006 | Thissen et al. |
| 2006/0200745 A1 | 9/2006 | Furmanski et al. |
| 2006/0205395 A1 | 9/2006 | Barone et al. |
| 2006/0218590 A1 * | 9/2006 | White .............................. 725/46 |
| 2006/0277576 A1 | 12/2006 | Acharya et al. |
| 2007/0055629 A1 | 3/2007 | Walker et al. |
| 2007/0061860 A1 * | 3/2007 | Walker et al. ................. 725/117 |
| 2007/0067597 A1 | 3/2007 | Chen et al. |
| 2007/0073834 A1 | 3/2007 | Charlebois et al. |
| 2007/0074240 A1 | 3/2007 | Addington et al. |
| 2007/0078944 A1 | 4/2007 | Charlebois et al. |
| 2007/0104220 A1 | 5/2007 | Charlebois |
| 2007/0115929 A1 | 5/2007 | Collins et al. |
| 2007/0117536 A1 | 5/2007 | Walker et al. |
| 2008/0194196 A1 | 8/2008 | Angelhag et al. |
| 2008/0263599 A1 | 10/2008 | Knudson et al. |
| 2009/0125952 A1 | 5/2009 | Chen et al. |
| 2009/0150922 A1 | 6/2009 | Russ et al. |
| 2010/0154000 A1 | 6/2010 | Macrae et al. |

FOREIGN PATENT DOCUMENTS

| | | |
|---|---|---|
| CN | 1301454 A | 6/2001 |
| CN | 1310549 A | 8/2001 |
| CN | 1568603 | 1/2005 |
| CN | 1303568 A | 7/2011 |
| EP | 0609936 | 8/1994 |
| EP | 0749221 | 12/1996 |
| EP | 1089560 | 4/2001 |
| EP | 1193976 A2 | 3/2002 |
| EP | 0820193 | 4/2002 |
| EP | 1193976 A2 | 4/2002 |
| JP | 63036625 A | 2/1988 |
| JP | 1994291780 | 10/1994 |
| JP | 6336625 A | 12/1994 |
| JP | 8506938 | 7/1996 |
| JP | 08506941 A | 7/1996 |
| JP | 08506942 A | 7/1996 |
| JP | 8275077 A | 10/1996 |
| JP | 10276380 A | 10/1998 |
| JP | 11155138 | 6/1999 |
| JP | 1999175426 | 7/1999 |
| JP | 2000349725 A | 12/2000 |
| JP | 2001054089 A | 2/2001 |
| JP | 2001092880 A | 4/2001 |
| JP | 2001217860 A | 8/2001 |
| JP | 2001230996 A | 8/2001 |
| JP | 2001519626 A | 10/2001 |
| JP | 2002508637 T | 3/2002 |
| JP | 2002125161 A | 4/2002 |
| JP | 2002171228 A | 6/2002 |
| JP | 2002176589 A | 6/2002 |
| JP | 2003101812 A | 4/2003 |
| JP | 2003134490 A | 5/2003 |
| JP | 2003203035 A | 7/2003 |

(56) References Cited

FOREIGN PATENT DOCUMENTS

| | | |
|---|---|---|
| JP | 2003289520 A | 10/2003 |
| JP | 2004007063 A | 1/2004 |
| JP | 2004046833 | 2/2004 |
| JP | 2004056178 A | 2/2004 |
| JP | 2004186741 A | 7/2004 |
| JP | 2004287978 A | 10/2004 |
| JP | 2005039853 | 2/2005 |
| JP | 2005079989 A | 3/2005 |
| JP | 2005149129 A | 6/2005 |
| JP | 2006135388 | 5/2006 |
| KR | 19990021860 | 3/1999 |
| KR | 1020000059098 | 10/2000 |
| KR | 20010034740 | 4/2001 |
| KR | 20030001368 | 1/2003 |
| RU | 2073913 | 2/1997 |
| RU | 2220513 | 12/2003 |
| RU | 2239293 | 10/2004 |
| RU | 2254611 | 6/2005 |
| RU | 2321965 | 4/2008 |
| TW | 1226797 | 1/2005 |
| TW | 1233560 | 6/2005 |
| TW | 200523781 | 7/2005 |
| TW | 1242190 | 10/2005 |
| WO | 9414282 | 6/1994 |
| WO | WO9414279 | 6/1994 |
| WO | 9843426 | 10/1998 |
| WO | WO9843427 | 10/1998 |
| WO | 9918721 A1 | 4/1999 |
| WO | WO9949663 A1 | 9/1999 |
| WO | WO9952285 A1 | 10/1999 |
| WO | 00/21006 A1 | 4/2000 |
| WO | WO0021006 | 4/2000 |
| WO | 0028742 | 5/2000 |
| WO | 0033197 | 6/2000 |
| WO | 01/63900 A1 | 8/2001 |
| WO | WO0163900 A1 | 8/2001 |
| WO | WO0217567 | 2/2002 |
| WO | 0239741 | 5/2002 |
| WO | 02065803 | 8/2002 |
| WO | 02084524 | 10/2002 |
| WO | 02087273 | 10/2002 |
| WO | 02099673 | 12/2002 |
| WO | WO03003704 A2 | 1/2003 |
| WO | WO2004002187 | 12/2003 |
| WO | 2004021671 | 3/2004 |
| WO | 2004079589 | 9/2004 |
| WO | 2005022791 | 3/2005 |
| WO | 2005045603 | 5/2005 |
| WO | WO2005060257 A1 | 6/2005 |
| WO | 2005069624 | 7/2005 |
| WO | 2006015226 | 2/2006 |
| WO | 2006099239 | 9/2006 |
| WO | WO2007033143 | 3/2007 |

OTHER PUBLICATIONS

Landler, M., "The Dishes Are Coming: Satellites Go Suburban," New York Times, Late Edition—Final Ed., col. 5, p. 37, May 29, 1995.*
Das, S., "STAR News Goes Pay, to Attract Flat Rate of Rs 2," Financial Express, Aug. 4, 1999.*
Steinberg, D., "Comcast to Roll out New Sports Package for Digital Cable," Philadeplpihia Inquirer, City edition, p. D02, Aug. 1, 2004.*
Earnshaw, et al., "The TV-Anytime Content Reference Identifier," Network Working Group, RFC 4078, May 2005.
Peyret, et al., "Smart Cards Provide Very High Security and Flexibility in Subscribers Management," Aug. 1990, IEE Transactions and Consumer Electronics, vol. 36, No. 3, pp. 744-752.
Wong, et al., "Xstream: A Middleware for Streaming XML Contents over Wireless Environments," IEEE Transactions on Software Engineering, vol. 30, No. 12, Dec. 2004, pp. 918-935.
Wong, et al., "Efficient Management of XML Contents over Wireless Environment by Xstream," 2004 ACM Symposium on Applied Computing, pp. 1122-1127.
ISO-IEC 15706, Information and documentation—International standard Audiovisual Number (ISAN), 2002.
IPDC in DVB-H: Technical Requirements CBMS1026 v1.0.0 Rev. 1/TM 3095 Rev.2, 2004.
OMA: "Mobile Broadcast Services Requirements" Candidate Version 1.0, Feb. 3, 2005, pp. 1-69, pp. 14-21.
International Search Report—PCT/US06/060691, International Search Authority—European Patent Office, May 18, 2007.
Written Opinion—PCT/US06/060691, International Search Authority—European Patent Office, May 18, 2007.
International Preliminary Report on Patentability—PCT/US06/060691, The International Bureau of WIPO—Geneva, Switzerland, May 22, 2008.
ESG Datamodel Comparison between OMA BCAST and DVB CBMS, Aug. 22, 2005, Open Mobile Alliance Ltd.
Taiwanese Search Report—095133703—TIPO—Apr. 8, 2010 (051242).
Taiwanese Search report—095133272—TIPO—Oct. 7, 2010(051256).
Tomoko ITAO, Introduction of Dynamically Adaptive Networking Service Environment: DANSE, Multimedia, Distributed, Cooperative and Mobile (DICOMO), Symposium Collected Papers, 1997—2000, Ver. 1.1. [DVD-ROM], Japan, Aggregate Corporation Information Processing Society, Jul. 2, 1997, pp. 125-130.
Supplementary European Search Report—EP06803088—Search Authority—The Hague—Feb. 10, 2011 (050012EP).
Office Action in Canadian application 2621676 corresponding to U.S. Appl. No. 12/353,869, citing CA2548227 and US20040048503 dated Jan. 13, 2011 (051256CA).
Translation of Office Action in Chinese appiication 200680041815.8 corresponding to U.S. Appl. 11/270,372, citing CN1303568 dated Feb. 10, 2011 (051242CN).
Translation of Office Action in Japan application 2008-540332 corresponding to U.S. Appl. No. 11/270,165, citing WO2005045603A2, IPDC_in_DVB_H_pgs._11-25, Jun. 23, 2004, JP2005039853 and JP11155138 dated Mar. 8, 2011 (060137JP).
Translation of Office Action in Japan application 2008-540334 corresponding to U.S. Appl. No. 11/270,167, citing JP8506938 and JP2006135388 dated Feb. 8, 2011 (060138JP).
Wong, et al., Xstream: A Middleware for Streaming XML Contents over Wireless Environments, IEEE Transactions on Software Engineering, Dec. 2004, vol. 30, No. 12.
Kazuo Masuda, "Visual Explorer of Kazuo MASUDA," PC USER, Softbank Publishing Corp., Mar. 2005, vol. 12, No. 3, pp. 78-81.

* cited by examiner

US 8,600,836 B2

SYSTEM FOR DISTRIBUTING PACKAGES AND CHANNELS TO A DEVICE

BACKGROUND

REFERENCE TO CO-PENDING APPLICATIONS FOR PATENT

The present Application for Patent is related to the following co-pending U.S. Patent Applications:

"METHODS AND APPARATUS FOR DISTRIBUTING CONTENT TO SUPPORT MULTIPLE CUSTOMER SERVICE ENTITIES AND CONTENT PACKAGERS", having U.S. patent application Ser. No. 11/270,199, filed Nov. 8, 2005, assigned to the assignee hereof, and expressly incorporated by reference herein, "APPARATUS AND METHODS OF OPEN AND CLOSED PACKAGE SUBSCRIPTION", having U.S. patent application Ser. No. 11/270,372, filed Nov. 8, 2005, assigned to the assignee hereof, and expressly incorporated by reference herein, "METHOD AND APPARATUS FOR DELIVERING CONTENT BASED ON RECEIVERS CHARACTERISTICS", having U.S. patent application Ser. No. 11/270,413, filed Nov. 8, 2005, assigned to the assignee hereof, and expressly incorporated by reference herein, "APPARATUS AND METHODS FOR PROVIDING AND PRESENTING CUSTOMIZED CHANNEL INFORMATION", having U.S. patent application Ser. No. 11/270,166, filed Nov. 8, 2005, assigned to the assignee hereof, and expressly incorporated by reference herein, "APPARATUS AND METHODS FOR DELIVERING AND PRESENTING AUXILIARY SERVICES FOR CUSTOMIZING A CHANNEL", having U.S. patent application Ser. No. 11/270,370, filed Nov. 8, 2005, assigned to the assignee hereof, and expressly incorporated by reference herein, "METHODS AND APPARATUS FOR DELIVERING REGIONAL PARAMETERS", having U.S. patent application Ser. No. 11/270,210, filed Nov. 8, 2005, assigned to the assignee hereof, and expressly incorporated by reference herein, "METHODS AND APPARATUS FOR FRAGMENTING SYSTEM INFORMATION MESSAGES IN WIRELESS NETWORKS", having U.S. patent application Ser. No. 11/270,168, filed Nov. 8, 2005, assigned to the assignee hereof, and expressly incorporated by reference herein, "FLEXIBLE SYSTEM FOR DISTRIBUTING CONTENT TO A DEVICE", having U.S. patent application Ser. No. 11/270,165, filed Nov. 8, 2005, assigned to the assignee hereof, and expressly incorporated by reference herein; and "METHODS AND APPARATUS FOR PROVIDING SYSTEM INFORMATION TO A WIRELESS DEVICE", having U.S. Provisional Patent Application Ser. No. 60/735,044, filed Nov. 8, 2005, assigned to the assignee hereof, and expressly incorporated by reference herein.

FIELD

The present Application for Patent relates generally to content distribution systems, and more particularly, to a system for distributing content to a device.

BACKGROUND

In current content delivery/media distribution systems, providers make services available over proprietary networks, so that devices operating on their networks will have the ability to receive those services. Some providers may be billing and customer service (BCS) providers.

For a typical portable device, the entire relationship between the customer and the network may be managed by a BCS provider exclusively. Oftentimes, the device has a subsidy associated with the user's agreement relating to the primary or initiating network service agreement. This results in the customer buying all services via the primary network's BCS provider. This situation may be acceptable, when the voice, data, and media networks have a single ownership. However, as devices gain access to multiple networks, there is an increasing need to support multiple content packagers and BCS providers. In addition, BCS providers may decide to change packages and the content of those packages.

Therefore, what is needed is a system to distribute content to a device on a data network that supports multiple content packagers and customer service entities in a flexible manner.

SUMMARY

In one or more embodiments, is distribution system is provided that operates to distribute services on a data network while supporting multiple content packagers and customer service entities.

In an aspect, a method of organizing packages and channels in a device comprises receiving a plurality of packages, at least one package having an associated weight, wherein each package has a set of associated channels, and ordering the plurality of packages based on associated package weight.

In an aspect, a method of organizing packages and channels in a device comprises receiving a plurality of ordered packages, wherein at least one package is ordered according to an associated package weight, and displaying each package according to the order of each package.

In an aspect, a wireless device comprises a transceiver configured to receive a plurality of ordered packages, wherein at least one package is ordered according to an associated weight, a processor configured to process the plurality of ordered packages for display, a user interface configured to select a package from the plurality of ordered packages, a memory coupled to the processor configured to store the plurality of ordered packages, and a display coupled to the processor configured to display the stored plurality of ordered packages according to their order.

In an aspect, a wireless device comprises means for receiving a plurality of ordered packages, wherein at least one package is ordered according to an associated weight, and means for displaying each package according to the order of each package.

In an aspect, a server comprises a transceiver configured to receive a plurality of packages, wherein at least one package is ordered according to an associated weight, and a processor configured to order each package of the plurality of package according to an associated package weight, and a memory coupled to the processor configured to store ordered plurality of packages.

In an aspect, a server, comprising means for receiving a plurality of packages, at least one package having an associated weight, wherein each package has a set of associated channels, and means for ordering the plurality of packages based on their associated weight.

Other aspects of the embodiments will become apparent after review of the hereinafter set forth Brief Description of the Drawings, Description, and the Claims.

BRIEF DESCRIPTION OF THE DRAWINGS

The foregoing aspects of the embodiments described herein will become more readily apparent by reference to the following detailed description when taken in conjunction with the accompanying drawings wherein.

DESCRIPTION

Figure 1:
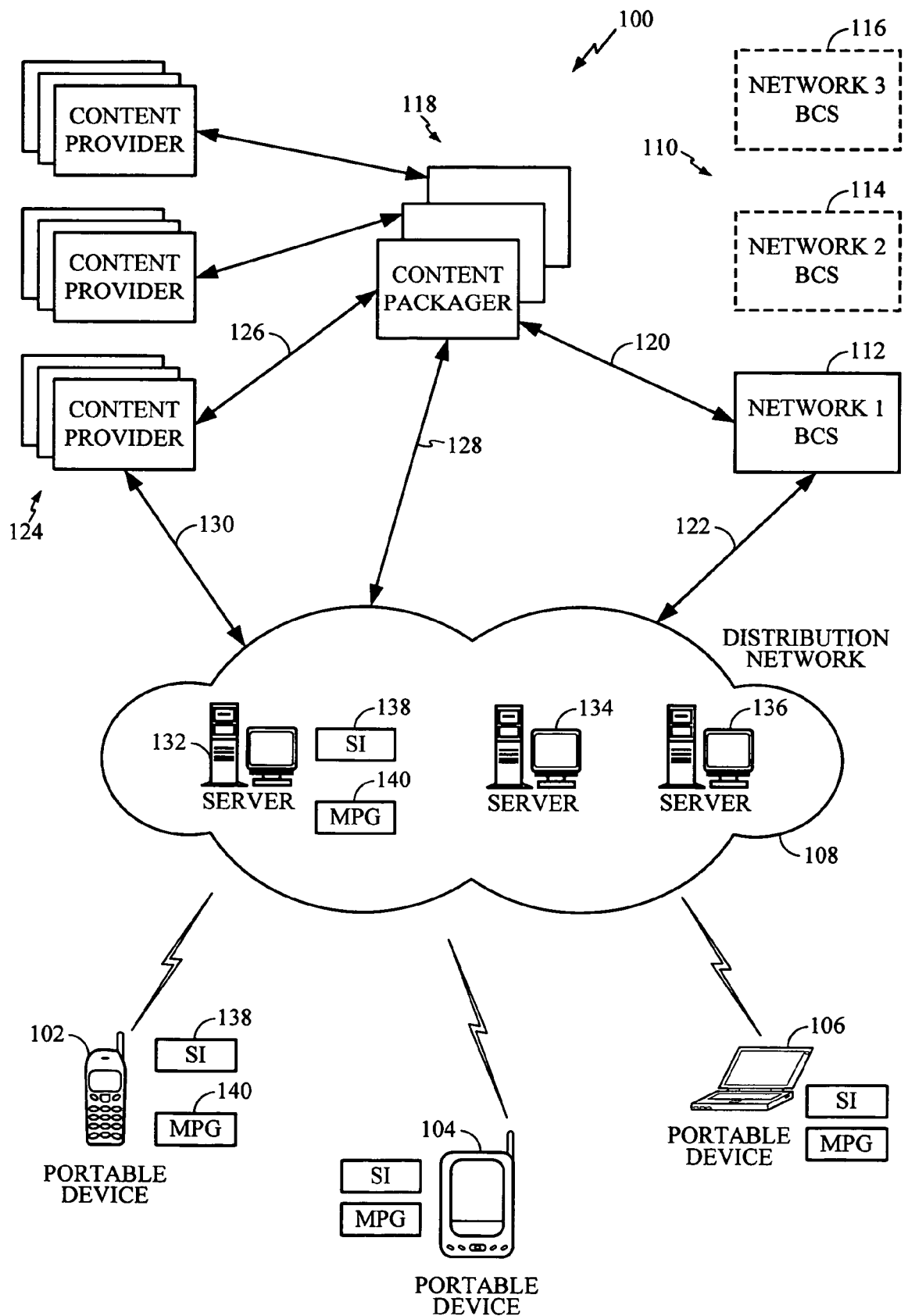
FIG. 1 shows a network that comprises an embodiment of a distribution system.

The description describes embodiments of a flexible distribution system that supports multiple content packagers and customer service entities on a data network. The system is especially well suited for distributing content to portable devices having limited resources, but may be used with any type of device. The system may also be used in any type of network environment, including but not limited to, communication networks, public networks, such as the Internet, private networks, such as virtual private networks (VPN), local area networks, wide area networks, long haul networks, or any other type of data or communication network.

Definitions

The following definitions apply:

| Term | Definition |
|---|---|
| Activation | The placement of a Device into a state that causes it acquires SI and Services. |
| Add-on Package | A Package that may be subscribed to after a Parent Package is subscribed to. |
| Auto-Subscribed Package | A Package that the Device will subscribe to without the user explicitly selecting it, typically as a result of subscription to a different Package. |
| Auxiliary Presentation | A Presentation on an Auxiliary Service, typically presented at a defined time in relation to a Presentation on the Base Service. |
| Auxiliary Service | A Service used to customize or provide enhancements to a Base Service. It is not displayed in the MPG. |
| Barker | A Presentation advertising a Channel or Package that a user is not subscribed to. |
| Base Service | The primary Service represented by a Channel. |
| BCS Service Provider | Business entity that provides end user billing and customer support services on behalf of one or more Content Packagers. Each Device is associated with a BCS Provider. |
| Blackout | A set of LOIs and WOIs in which access to a Presentation is forbidden. |
| Channel | A view of a Base Service that may be customized through replacement of certain attributes of the Base Service and/or association with one or more Auxiliary Services. |
| Channel Weight | The Weight to be assigned to MPG Titles of Presentations delivered via the Channel. |
| Classification Scheme | A set of language-independent terms that defines the vocabulary for a particular application or domain. |
| Classification Scheme Alias | A string that may be used as short form representation of a Classification Scheme namespace |
| Classification Scheme Table | An XML Table formatted according to MPEG-7 specifications which defines a set of Classification Schemes and Classification Scheme Aliases. |
| Closed Package | A Package that is not accepting new subscriptions |
| Contact Window | An interval of time in which a Non Real Time Presentation is being transmitted. |
| Content Packager | Business entity that defines Packages and offers them for subscription through one or more associated BCS Service Providers. Also called a Content Retailer. |
| Content Provider | Business entity that supplies content delivered to the user through Services |
| Controlled Term | A token that is resolved to an entry in a Classification Scheme Table. |
| Default Language | The language in which information is to be delivered to a user if the user has not selected some other language in which the information available. |
| Device | Customer Equipment that can be activated to access Service. |
| EULA | End User Licence Agreement - a contract between the User and the BCS Provider that specifies the default terms of subscription. It may be superseded by a Terms of Use Agreement for a particular Content Packager. |
| Excluded Package | A member of a set of Packages which a user is not permitted to subscribe to if it subscribes to a specified Package |

-continued

| Term | Definition |
| --- | --- |
| Excluded Service | A Subscribed Service that is not downloaded to or stored on the device, typically as a result of a user action to exclude access to the Service. See also Included Service, Non-excludable Service |
| Flow | Logical stream within a Multiplex, typically used to deliver a single Media component of a Realtime Presentation, or a file containing a Non Real Time Presentation, or SI Messages. |
| Icon | A still image that may be overlaid on part of the main image of a Device display screen. |
| Included Service | A Subscribed Service delivered to the device. See also Excluded Service, Non-excludable Service. |
| Intro | An Auxiliary Presentation that is delivered to the user before the associated Presentation on the Base Service. |
| IP Datacast Presentation | A Presentation consisting of IP-formatted content addressed to a defined set of IP multicast addresses. |
| IP Datacast Service | A Service delivering IP Datacast Presentations. |
| Local Operations Infrastructure | See LOI |
| LOI | Logical grouping of infrastructure deployed to provide Network coverage of a specific local-area. |
| Marketplace Common Message | An SI Message used to deliver information about the BCS Providers associated with the Network and certain Classification Scheme Tables used in the Network. |
| Marketplace Content Retailer Message | An SI Message used to deliver information about Content Retailers and the Packages, Tiers and Channels available through the Content Retailers. |
| Marketplace Definition Protocol | The protocol managing transmission and acquisition of MSI. |
| Marketplace Information | Information describing the BCS Providers, Content Packagers, Packages, Tiers and Channels. |
| Marketplace & Service Information | Marketplace Common Message, Marketplace Content Packager Messages and Service Definition Message. |
| Media | Formats for representing information, such as moving or still images, sound, or text, possibly associated with metadata used to assist in interpretation of the media content. |
| Media Presentation Guide | The schedule of MPG Titles available in the Network, delivered to the Device as a sequence of MPG Blocks. |
| MIME Type | A media type delivered in a Non Real Time or IP Datacast Presentation and the associated metadata identifying it according to the conventions of RFCs 2045-2049 (Error! Reference source not found. - Error! Reference source not found.). |
| MPG | See Media Presentation Guide |
| MPG Block | An SI Message delivering the set of MPG Titles and Contact Windows available in a Multiplex for a defined time window, the MPG Block Duration. |
| MPG Delivery Protocol | The protocol managing transmission and acquisition of MPG Blocks. |
| MPG Title | The description of an instance of a Presentation that is available for viewing at a specified time. |
| MSI | See Marketplace and Service Information |
| Multiplex | The set of Flows available in a given LOI or WOI. |
| Network | A multicast network using the Physical Layer. |
| Non-Excludable Service | A Subscribed Service that the Device is not allowed declining delivery of. See also Included Service, Excluded Service. |
| Non Real Time Presentation | A Presentation that is stored for later retrieval and presentation to the user. |
| Non Real Time Service | A Service delivering content consisting entirely of Non Real Time Presentations |
| Outro | An Auxiliary Presentation that is delivered to the user after the associated Presentation on the Base Service. |
| Package | A Package is a set of Tiers and associated Auxiliary Services. Packages are offered for purchase on the System. |
| Package Weight | The Weight of a Package. |
| Parent Package | A Package for which a prior subscription must exist before the user may subscribe to an Add-on Package. |
| Per MPG Title Service | A Service delivering both Real Time Presentations and Non Real Time Presentations. The type of a particular Presentation is determined from the MPG Title for the Presentation. |
| Presentation | A set of media segments which may be presented to the user concurrently and/or consecutively and which can be described by a single MPG Title. |
| Presentation Window | An interval of time in which a user may view a Presentation. |
| Primary Flow | A Flow delivering, inter alia, a list of the current Versions of the various types of SI Message. |
| Private Content Retailer | A Content Retailer which requires that users establish access right to it by means not specified in the SI. |
| Private Package | A Package offered by a Private Content Retailer. |
| Private Channel | A Channel offered through a Private Package. |
| Private Service | A Service to which access may only be offered as a Private Channel. |

-continued

| Term | Definition |
| --- | --- |
| Rating | A classification of a Service or Presentation content that provides guidance on the suitability of the content. A Rating is usually a level in a single scale, but may have several dimensions. |
| Real Time Presentation | A Presentation consisting of Media that is presented to the user as it is received and processed, and need not be stored for later retrieval. |
| Real Time Service | A Service delivering content consisting entirely of Real Time Presentations. |
| Service Definition Message | An SI Message delivering information about the Services available in the Network |
| Service Schedule | The temporal order in which Presentations are available for presentation to the user. |
| Service | A sequence of Presentations offered under a single label and delivered using a defined set of Flows. |
| SI | See System Information |
| SI Flow | A Flow used to deliver SI Messages |
| SI Framing Protocol | The protocol for transmitting an SI Message |
| SI Message | A message containing all the elements of an SI Message schema. |
| SI Message Fragment | A message containing a copy of the root element and a subset the other elements of an SI Message Instance |
| Subscribed Service | A Service that a user can access, having subscribed to a Package that includes the right to access the Service. |
| System Information | The set of information that enables a Device to locate Services or subscribe to Packages on behalf of the user, and to describe Marketplace Information, Services and MPG Titles to the user. |
| Terms of Use Agreement | A contract between the user and the Content Retailer that controls the terms of subscription to a Package. See also EULA. |
| Tier | A set of Channels grouped together for subscription purposes. Tiers are combined to create Packages. |
| Version | An attribute of an SI Message that identifies the particular set of attributes and element values transported by the SI Message, allowing it to be identified as a copy of another SI Message. |
| Weight | An attribute whose value controls the order in which information about an element is presented to the user in a list of elements of the same type. |
| Wide Area Operations Infrastructure | See WOI |
| WOI | Logical grouping of infrastructure deployed to provide Network coverage of a specific wide-area. |

FIG. 1 shows a network 100 that comprises an embodiment of a distribution system. The network 100 comprises portable devices (102, 104 and 106), BCS providers 110, content packagers 118, and content providers 124 all coupled to a distribution network 108.

The devices (102, 104 and 106) are portable devices that communicate with the distribution network 108 to allow device users to access the distribution network 108 to subscribe to receive available packages.

The BCS providers 110 accept and maintain user subscriptions to packages that are received from the distribution network 108. In an embodiment, each of the devices (102, 104 and 106) is associated with a single BCS provider. For example, the device 102 is associated with BCS 112, device 104 is associated with BCS 114, and device 106 is associated with BCS 116. In another embodiment, a device (102, 104 or 106) may be associated with more than one BCS provider. For clarity, the operation of BCS provider 112 is described in detail; however, the BCS providers 114 and 116 operate in a similar fashion.

The BCS provider 112 establishes relationships with one or more content packagers 118 through subscription agreements, as illustrated at 120. These agreements define which content packagers 118 offer packages that a device associated with a BCS provider 112 may subscribe to receive. In an embodiment, the BCS provider 112 notifies the distribution network 108 of its association with one or more content packagers 118, as shown at 122.

The content packagers 118 define and maintain packages. A package ultimately is a set of services available on the distribution network 108 which may be offered to devices.

The device user obtains access to the services by subscribing to the package. The content packagers 118 obtain the right to offer access to services from the content providers 124 through content retail agreements, as shown at 126. The content packagers 118 notify the distribution network 108 of the definition of the packages created by the content packagers 118, as shown at 128.

The content providers 124 supply the content of the services to the distribution network 108, as shown at 130. They also provide descriptions of the content that allows the distribution network 108 to maintain a media presentation guide (MPG) which provides a description to the device users of the services available through the distribution network 108 at any given time.

In an embodiment, the MPG allows a subscriber to select and play content, but not subscribe. In an alternative embodiment, the MPG may allow a user to subscribe in addition to allowing a user to select and play content.

The distribution network 108 is responsible for the delivery of the services to the devices (102, 104 and 106). It is also responsible for the creation and delivery of accompanying system information (SI) parameters. In an embodiment, the communications between the distribution network 108 and the devices (102, 104 and 106) are organized into a set of flows, e.g. to carry different media components of a real time service, or IP streams addressed to different IP ports in an IP Datacast service. All flows which are to be made available in a particular local or wide area are grouped into a corresponding multiplex.

The distribution network 108 comprises any combination of wired and wireless network technologies. For example, the distribution network 108 may be a wireless multicast network. In an embodiment, the distribution network 108 comprises servers (132, 134 and 136). For clarity, the operation of server 132 is described in detail; however, servers 134 and 136 operate in a similar fashion.

Server 132 operates to receive subscription parameters, as shown at 122, from one more of the BCS providers 110. The server 132 also receives package parameters 128 from the content packagers 118, and programming parameters 130 from the content providers 124. The server 132 processes the received parameters to generate the system information (SI) parameters 138 and a media presentation guide (MPG) 140.

The SI parameters 138 comprise a set of information that enables a device to locate services or subscribe to packages, and to describe subscription information, services, and MPG titles to a device user. The MPG 140 comprises a schedule of available titles that is delivered to a device as a sequence of MPG blocks.

During operation of an embodiment of the distribution system, the distribution network 108 activates the devices (102, 104 and 106) and transmits the SI 138 and MPG 140. The devices (102, 104 and 106) then operate to process the SI 138 and MPG 140 to render information to the device users to allow the device users to subscribe to one or more packages. For example, the user of the device 102 selects a package for subscription from the rendered information. The device 102 then transmits a subscription request to the distribution network 108 to subscribe to receive the selected package.

In one or more embodiments, the distribution server 132 operates in an embodiment of the distribution system by performing one or more of the following functions.

1. Obtain subscription, package, and presentation guide parameters associated with selected BCS providers, content packagers and content providers.
2. Generate SI and MPG parameters.
3. Activate a device to subscribe to packages over the distribution network.
4. Transmit the SI and MPG to the activated device.
5. Receive one or more subscription requests from the device.

Thus, embodiments of the distribution system operate to support multiple content packagers and BCS providers on a data network to allow devices associated with different BCS providers to subscribe to receive available packages. It should be noted that the network 100 illustrates just one network configuration, and that other network configurations or arrangements are possible within the scope of the described embodiments.

Figure 2:
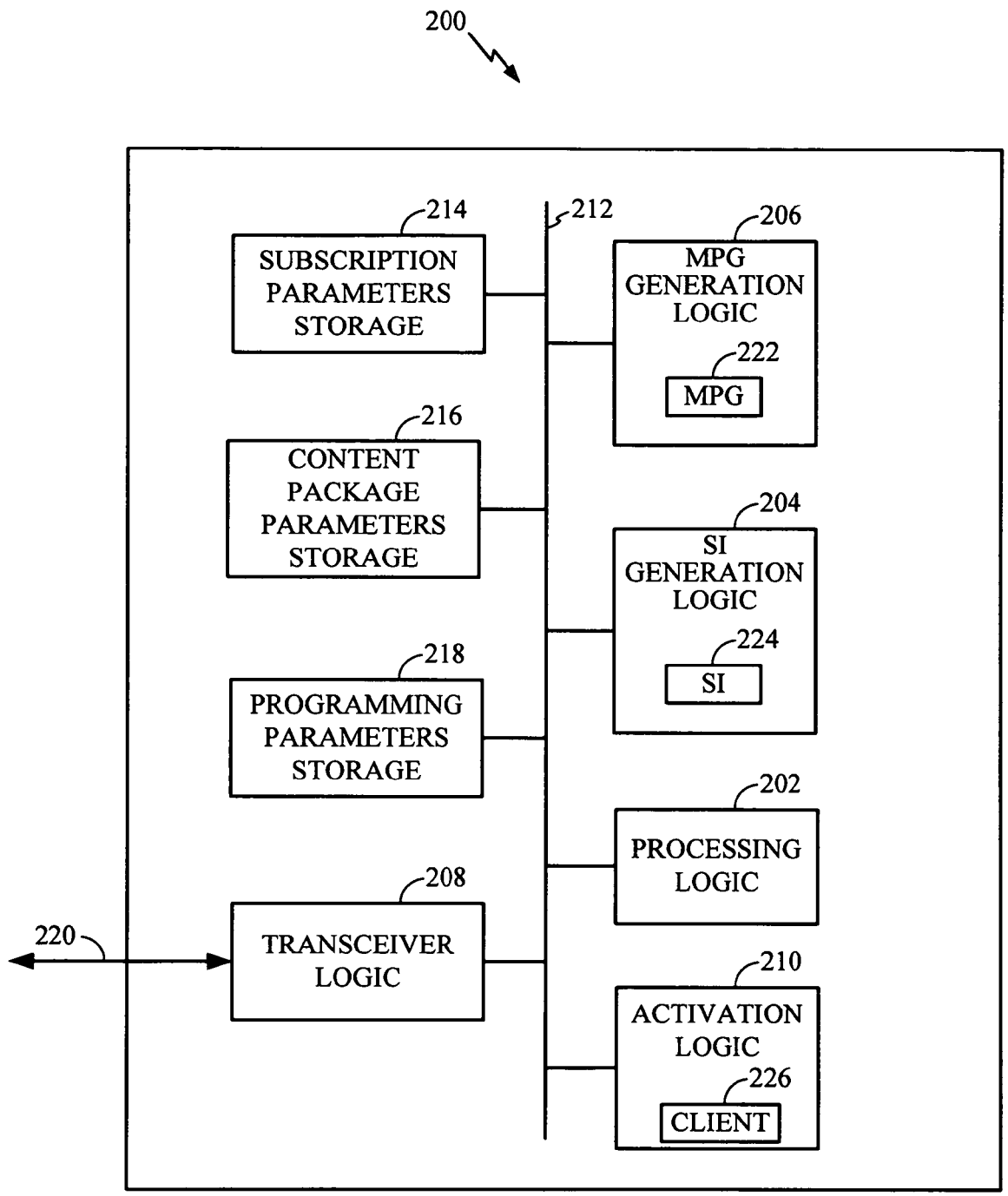
FIG. 2 shows a diagram of an embodiment of a distribution server suitable for use in one or more embodiments of a distribution system.

FIG. 2 shows a diagram of an embodiment of a distribution server 200 suitable for use in one or more embodiments of a distribution system. For example, the distribution server 200 may be used as the distribution server 132 in FIG. 1. The distribution server 200 comprises processing logic 202, SI generation logic 204, MPG generation logic 206, transceiver logic 208, and activation logic 210 all coupled to an internal data bus 212. The server 200 also comprises subscription parameter storage 214, content package parameter storage 216, and programming parameter storage 218, which are all also coupled to the data bus 212.

In one or more embodiments, the processing logic 202 comprises a CPU, processor, gate array, hardware logic, memory elements, virtual machine, software, and/or any combination of hardware and software. Thus, the processing logic 202 generally comprises logic to execute machine-readable instructions and to control one or more other functional elements of the server 200 via the internal data bus 212.

The transceiver logic 208 comprises hardware and/or software that operates to allow the server 200 to transmit and receive data and/or other information with remote devices or systems via communication channel 220. For example, in an embodiment, the communication channel 220 comprises any suitable type of communication link to allow the server 200 to communicate with one or more data networks and/or devices coupled to those data networks.

The storage logic (214, 216, and 218) comprises any suitable type of storage devices or elements that allow the server 200 to store information parameters. For example, in an embodiment the storage logic (214, 216, and 218) comprises any type of RAM, Flash memory, hard disk, or any other type of storage device.

In an embodiment, the processing logic 202 operates to communicate with one or more BCS providers through the transceiver logic 208 and channel 220. The BCS providers provide subscription parameters that are received by the processing logic 202 and stored in the subscription parameter storage 214. The processing logic 202 also operates to communicate with one or more content packagers through the transceiver logic 208 and channel 220. The content packagers provide package parameters that are receive by the processing logic 202 and stored in the package parameter storage 216. The processing logic 202 also operates to communicate with one or more content providers. The content providers provide programming parameters that are received by the processing logic 202 and stored in the programming parameters storage 218. A more detailed description of the subscription, package, and programming parameters is provided in another section of the document.

In one or more embodiments, the SI generation logic 204 comprises a CPU, processor, gate array, hardware logic, memory elements, virtual machine, software, and/or any combination of hardware and software. The SI generation logic 204 operates to retrieve parameters from the storage (214, 216, and 218) to generate SI parameters 224. For example, the SI logic 204 retrieves subscription parameters from the storage 214 that are associated with one or more BCS providers. The SI logic also operates to retrieves package parameters from the storage 216 and programming parameters from the storage 218 that are associated with each BCS provider. Thus, the SI generation logic 204 operates to generate SI parameters 224 that are associated with each BCS provider. A more detailed description and format of the SI parameters 224 is provided in another section of this document.

The MPG generation logic 206 comprises a CPU, processor, gate array, hardware logic, memory elements, virtual machine, software, and/or any combination of hardware and software. The MPG generation logic 206 operates to retrieve parameters from the programming parameters storage 218 to generate a MPG 222 that is associated with one or more BCS providers. A more detailed description and format of the MPG 222 is provided in another section of this document.

The activation logic 210 comprises a CPU, processor, gate array, hardware logic, memory elements, virtual machine, software, and/or any combination of hardware and software. The activation logic 210 operates to activate a device to allow the device to subscribe to available packages. The activation process need only occur once for each device that desires to subscribe to packages. For example, in an embodiment, the activation logic 210 comprises a client application 226 that is downloaded to the device during the activation process. For example, the client 226 is downloaded to the device using the transceiver logic 208. Once a device is activated by the activation logic 210, the client 226 runs on the device and operates to receive and display information about available packages and other related information to the device user. Thus, the activation logic 210 operates to allow the server 200 to identify and authenticate a device, thereby allowing the device to subscribe to one or more available packages.

During the activation process, the SI parameters 224 and MPG 222 are transmitted to a device being activated. The client executing on the device operates to render information from the SI parameters 224 and the MPG 222 so that the device may subscribe to receive available packages.

In an embodiment, the distribution system comprises program instructions stored on a computer-readable media, which when executed a processor, for instance, the processing logic 202, provides the functions of the server 200 described herein. For example, instructions may be loaded into the server 200 from a computer-readable media, such as a floppy disk, CDROM, memory card, FLASH memory device, RAM, ROM, or any other type of memory device or computer-readable media that interfaces to the server 200. In another embodiment, the instructions may be downloaded into the server 200 from an external device or network resource that interfaces to the sever 200 via the transceiver logic 208. The instructions, when executed by the processing logic 202, provide one or more embodiments of a distribution system as described herein.

In an embodiment, SI services fall into three classes:

1. Marketplace Definition services, providing information that allows users to subscribe to Packages.
2. Service Definition services, providing information that allows the Device to locate and interpret a Service.
3. Media Presentation Guide services, providing information about the content available on the services.

In an embodiment, Marketplace Definition SI informs a device of Classification Scheme Tables, the capabilities of the BCS Providers, and the packages offered by the Content Providers. The principal function is to communicate information about the packages.

Marketplace Definition SI defines the Classification Scheme Tables in use in the Network. A Classification Scheme Table is an infrastructural element that defines a set of common terms as used for a specified function in a particular Network, but which may vary between Networks, or which may exist in multiple forms, e.g. differentiated by language. Examples of such terms include Rating Schemes and Genres.

Classification Scheme Tables allow SI Messages to refer to the terms succinctly and in a controlled fashion.

Marketplace Definition SI defines the characteristics and capabilities of the BCS Providers related to subscription services. In an embodiment, the Marketplace Definition SI may define:

The set of Content Packagers associated with the BCS Provider. In an embodiment, a device can only subscribe to Packages which are provided by Content Packagers associated with the BCS Provider.

The Billing Policies available through the BCS Provider and the types of account ID that may be used, such as Credit Card subscriptions through PayPal.

Contact details for placing subscriptions to the BCS Provider, such as a telephone number, email address or webpage URL.

The Terms of Use agreement for the BCS Provider.

Marketplace Definition SI defines the characteristics and capabilities of the Content Packager related to subscription services. In an embodiment, it may define:

The Name of the Content Packager

Whether the Content Packager is Private or not.

Currencies in which Packages may be offered by the Content Packager

The End User License Agreement for the Content Packager

Additionally, the SI may define in an embodiment, a set of Auxiliary Services associated with a Content Packager. These services may provide supplemental information related to any channel offered through the Content Packager. They are monitored by a device so long as the device is subscribed to any package offered by the Content Packager.

In an embodiment, the principal information delivered by the Marketplace SI is the definition of the packages offered by the Content Packagers.

In principle, a package is a set of services, together with some affiliated characteristics such as the name of the package and its price. However, the package definition is not directly constructed as a list of Services. Instead, the package is defined as a set of tiers. In turn, each Tier is a set of Channels, where a channel is a view of a service.

Figure 3:
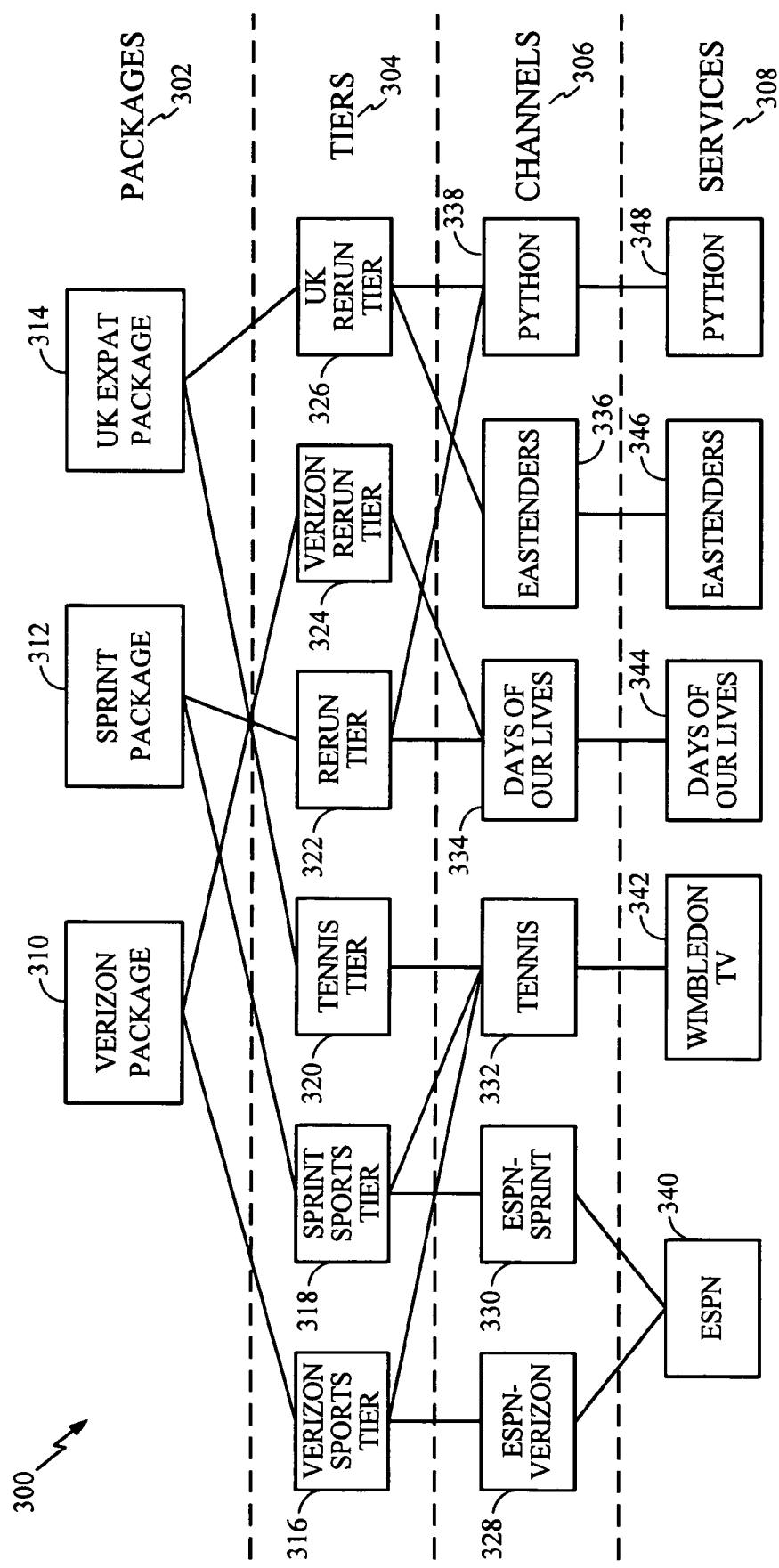
FIG. 3 shows an example of a flexible relationship between packages, tiers, channels and services in accordance with an embodiment.

An example of the relationship between packages, tiers, channels and services in accordance with an embodiment is shown in FIG. 3. FIG. 3 shows a hierarchal system 300 of packages 302, tiers 304, channels 306, and services 308 in accordance with an embodiment.

In this example, a Content Packager is creating packages 302 which will be branded for certain operators (here, Verizon 310 and Sprint 312), while also creating packages targeted at particular groups which may be offered by both operators (here, the "UK Expat Package" 314, targeted at a small but presumably high-end demographic). These packages 302 provide access to a number of Real Time Services which carry sports video and continuous reruns of popular television series, reformatted for the devices.

The tiers 304 shown include a Verizon sports tier 316, a Sprint sports tier 318, a tennis tier 320, a rerun tier 322, a Verizon rerun tier 324, and a UK tier 326. The channels 306 shown include ESPN-Verizon 328, ESPN-Sprint 330, tennis 332, Days of Our Lives 334, Eastenders 336, and Python 338. The services 308 include ESPN 340, Wimbledon TV 342, Days of Our Lives 344, Eastenders 346, and Python 348.

For the premium sports service ESPN, two channels 328, 330, are created, which provide different views of the service 340 that serve to brand it in a way that advertises a particular mobile network operator (Verizon and Sprint respectively in this example); otherwise, the channels are direct reflections of the services. The tiers 304 are defined, in this example, to provide logical groupings of channels according to the type of content offered.

The packages 302 then offer the users the opportunity to subscribe to combinations of tiers than provide access to services 308 likely to be of interest. Thus, the "UK Expat Package" 314 includes access to the "EastEnders" service 346 and to "Wimbledon Tennis" 342, but no access to general American sports channels, while the Verizon 310 and Sprint 312 packages include access to all sports of interest to their American subscribers, as well as access to reruns that have appeared in the US.

The Content Packager may choose to restrict access to packages by BCS Provider ID.

As well as providing access to a set of services 308, a package may be associated with one or more auxiliary services. These services may provide supplemental information related to any channel offered through the package. They are monitored by the device so long as it is subscribed to the package.

A tier is a set of channels which is treated as a logical group. A channel offered by a Content Packager shall appear in at least one tier, and may appear in more than one tier.

A tier has no meaning outside the context of a package. It is provided to allow compact representation of groups of services, and to provide flexibility in service management.

For example, if a service which is accessible through multiple packages becomes unavailable, it can be removed from the packages by redefining the tier(s) that include the service rather than redefining the packages themselves.

A channel is a view of a service presented to the user that is appropriate for a particular Package or Content Packager. It is the smallest unit of content which a user can subscribe to.

Subscription to a package automatically provides access to all channels in the package. However, a user may not wish to access certain channels, and a device can include a capability that allows a user to exclude access to such channels. The Content Packager may indicate that certain channels in the package are not excludable.

The concept of a channel allows the Content Packager to customize the service's appearance to the user. For example, the Content Packager can replace the default name of the service with a channel name, or it can override the service description with different text. Since a service may be offered through more than one package, it is possible to define several channels which resolve to the same service. The service underlying a channel is known as the Base Service.

As well as providing access to a Base Service, a channel may be associated with one or more Auxiliary services. These services provide supplemental information related to the channel. They are monitored by the device so long as it is accessing the channel.

In an embodiment, packages and channels are each assigned a weight. The weight is a resource used to manage the ordering of packages and channels within a device. It defines the default position of the package or channel relative to other packages or channels when they are presented to the user in a list. Thus, if packages from all Content Packagers are presented to the user in a single list, the order of presentation, in the absence of other considerations such as a user preference, is determined by the package weight. Similarly, MPG Titles from the MPG are, by default, presented to the user in order of channel weight.

In an embodiment, a user subscribes to a package via a subscription user interface on the device display. In an embodiment, the default ordering of the packages on the device display is determined according to package weights. Similarly, the default order of channels within a package is determined according to channel weights.

The values of the weights are agreed between all the Content Packagers and BCS Providers using the network. The means by which this is done is a policy decision. For example, blocks of weights may be assigned to different Content Packagers, allowing each Content Packager to assign weights freely.

In an embodiment, the weights may be used to differentiate between different packages and to differentiate between different channels such that specific functions may apply to particular packages and channels based on the weights. Thus, the weights may play a differential function role. In an embodiment, the weights may be encoded with conditions such that the package or channel has associated conditions for a given weight. For example, a weight of "101" may be a binary encoding representing that the associated package or channel has an associated first and third condition. It would be apparent to those skilled in the art that any encoding known in the art may be used to encode information in the form of weights.

An example of a function encoded in a weight is an embodiment, wherein a weight encodes a not-display function such that an associated package or channel is not displayed on a device. It would be apparent to those skilled in the art that any function known in the art may be encoded in a weight.

Each Package is assigned one or more prices. The price is associated with a subscription method (e.g. flat fee, weekly, monthly) that is charged to the user when the user subscribed to the package.

More than one subscription method may be offered. The semantics of the subscription methods are determined by the Content Packagers and the BCS Providers. In an embodiment, all subscription methods used shall refer only to the package being purchased. That is, a subscription method shall not represent an adjustment to the price of another subscription method, such as a percentage discount.

A package may be offered in more than one currency. Each device supports only one currency, the currency of the home country of the device (e.g. Euros, Pounds, U.S. Dollars, Yen). Only prices in the currency supported by the device are offered to the user.

Packages posses certain attributes that define their operation and interdependencies as packages, distinct from the services of which they are comprised.

In an embodiment, packages have states. In an embodiment, packages may be in one of two states: Open and Closed. In the Open state, the BCS Provider may accept new subscriptions to the package. In the Closed state, no new subscriptions are accepted. However, in the Closed state the package continues in existence for existing subscribers, and it is possible to change any and all characteristics of the package. The Closed state permits a package to be smoothly retired. When the package no longer has any subscribers, it can be removed from the SI.

Packages may have interdependencies. By default, Packages are offered a la carte. However, certain interdependencies may be defined between packages that restrict the user's ability to subscribe to the Packages independently of each other. As a result, the Packages offered to the user may depend on the user's existing subscriptions.

It is the responsibility of the Content Packager to define interdependencies that are meaningful and consistent.

A package may be a Parent Package. A package can be configured as an add-on to another package, which is the Parent Package. In this situation, the user is only permitted to subscribe to the package if the user is already subscribed to the Parent Package.

A package may have more than one Parent Package, in which case the user can only subscribe to the package if a subscription already exists for at least one of the Parent Packages. A package that does not have a Parent Package is a Root Package.

A package may be autosubscribed. An Autosubscribed Package is a package that is subscribed to by a device without user intervention. The package is autosubscribed when a device is activated by a BCS Provider associated with the Content Packager offering the package. Only Root Packages may be autosubscribed.

A package may be excluded. Subscription to a Package may prevent the user from subscribing to other Packages offered by the Content Packager.

Figure 4:
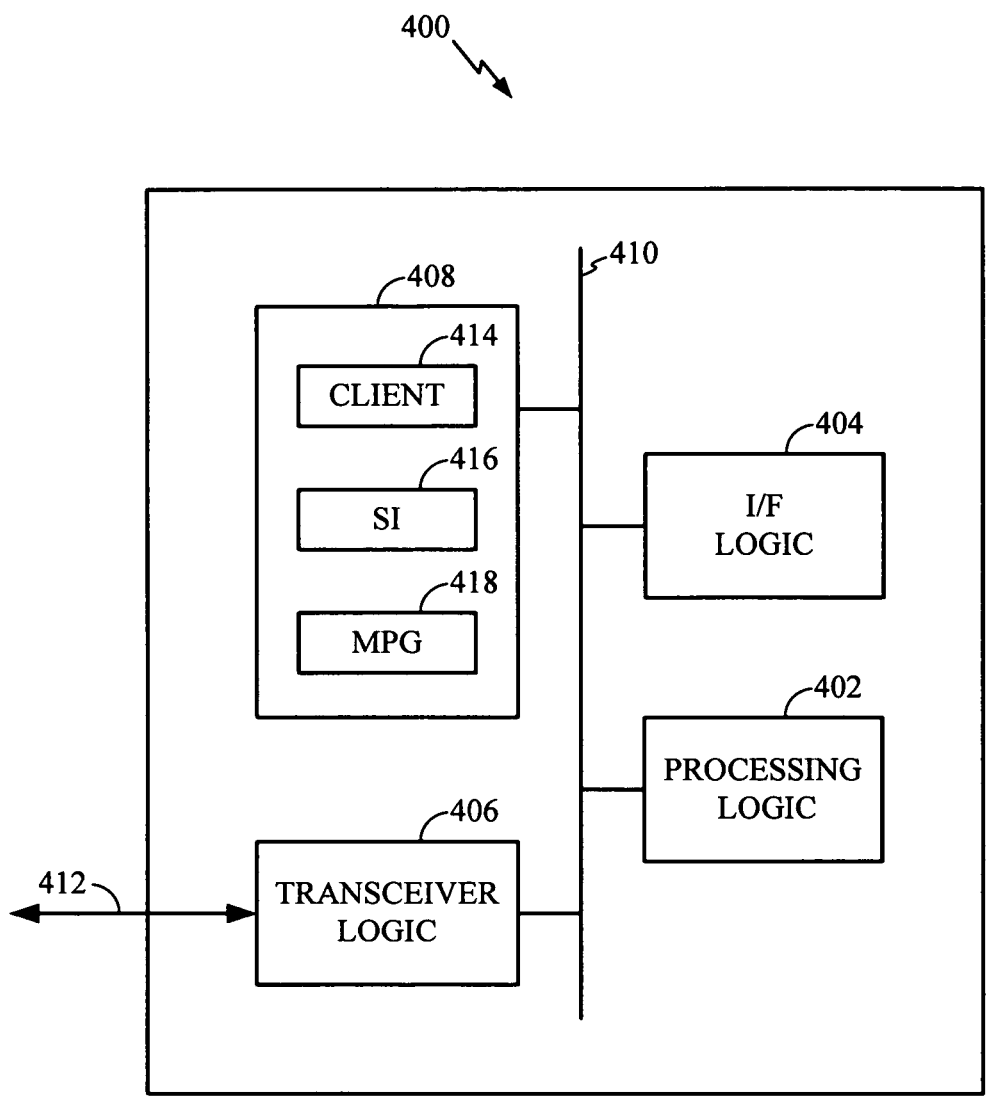
FIG. 4 shows a diagram of an embodiment of a device suitable for use in an embodiment of a distribution system.

FIG. 4 shows a diagram of an embodiment of a device 400 suitable for use in an embodiment of a distribution system. The device 400 comprises processing logic 402, device resources and interface logic 404, transceiver logic 406, and a memory 408 all coupled to a data bus 410.

In one or more embodiments, the processing logic 402 comprises a CPU, processor, gate array, hardware logic, memory elements, virtual machine, software, and/or any combination of hardware and software. Thus, the processing logic 402 generally comprises logic to execute machine-readable instructions and to control one or more other functional elements of the device 400 via the internal data bus 410.

The device resources and interface logic 404 comprise hardware and/or software that allow the device 400 to communicate with internal and external systems. For example, internal systems may include mass storage systems, memory, display driver, modem, or other internal device resources. The external systems may include user interface devices, printers, disk drives, or other local devices or systems. Thus, the device resources and interface logic 404 allows the device to render information on a device display and to receive user inputs through a user input device, such as a mouse, keypad, touch screen, or any other type of user input device.

The transceiver logic 408 comprises hardware and/or software that operate to allow the device 400 to transmit and receive data and/or other information with external devices or systems via communication channel 412. For example the communication channel 412 may comprise a network communication link, a wireless communication link or any other type of communication link.

During operation of one or more embodiments, the device 400 is activated thereby allowing the device 400 to subscribe to available packages over a distribution network. As part of the activation process, the device 400 receives a client application 414, SI parameters 416, and a MPG 418, which are received by the transceiver logic 406 and stored in the memory 408. For example, the device user controls the device to communicate with a distribution server (i.e., server 132 in FIG. 1) for the purpose of completing a one-time activation process. During the activation process, the client logic 414 is installed on the device. The server then transmits the SI parameters 416 and the MPG 418 to the device.

The client 414 provides a user interface (UI) that renders the MPG 418 on the device 400 to allow the device user to view the available packages. The client 414 also allows the device user to select one or more packages for subscription. The selected packages are identified in a subscription request that is part of a device-to-server protocol, which is implemented by the client 414. The client 414 then transmits the subscription request to the distribution server through the transceiver logic 406 and channel 412.

In an embodiment, the device 400 performs one or more of the following functions in one or more embodiments of a distribution system. It should be noted that the following functions may be changed, rearranged, modified, added to, or otherwise adjusted within the scope of the embodiments.
1. The device receives and installs a client application.
2. The device is activated with a distribution system.
3. The device receives SI parameters and a MPG.
4. The MPG is rendered on the device and displays the available packages to the device user.
5. After the user selects one or more packages for subscription, the client assembles a subscription request that is transmitted to the distribution system.
6. After the subscription request has been process by the distribution system, the device receives the services for which the user has subscribed.

For example, it would be apparent to those skilled in the art that steps 1, 2, and 3 above may be executed in any order. In addition, it would also be apparent to those skilled in the art that sub-steps of steps 1, 2, and 3 may be executed in a variety of orders. For example, a sub-step of step 2 may be performed in varying order with respect to a sub-step of step 3. Steps and sub-steps may be ordered to optimize the process.

In an embodiment, the system to host multiple service providers comprises program instructions stored on a computer-readable media, which when executed by the processing logic 402, provides the functions of the device 400 described herein. For example, instructions may be loaded into the device 400 from a computer-readable media, such as a floppy disk, CDROM, memory card, FLASH memory device, RAM, ROM, or any other type of memory device or computer-readable media that interfaces to the device 400 via the device I/F logic 404. In another embodiment, the instructions may be downloaded into the device 400 from a network resource that interfaces to the device 400 via the transceiver logic 406. The instructions, when executed by the processing logic 402, provide one or more embodiments of a system to host multiple service providers as described herein.

Figure 5:
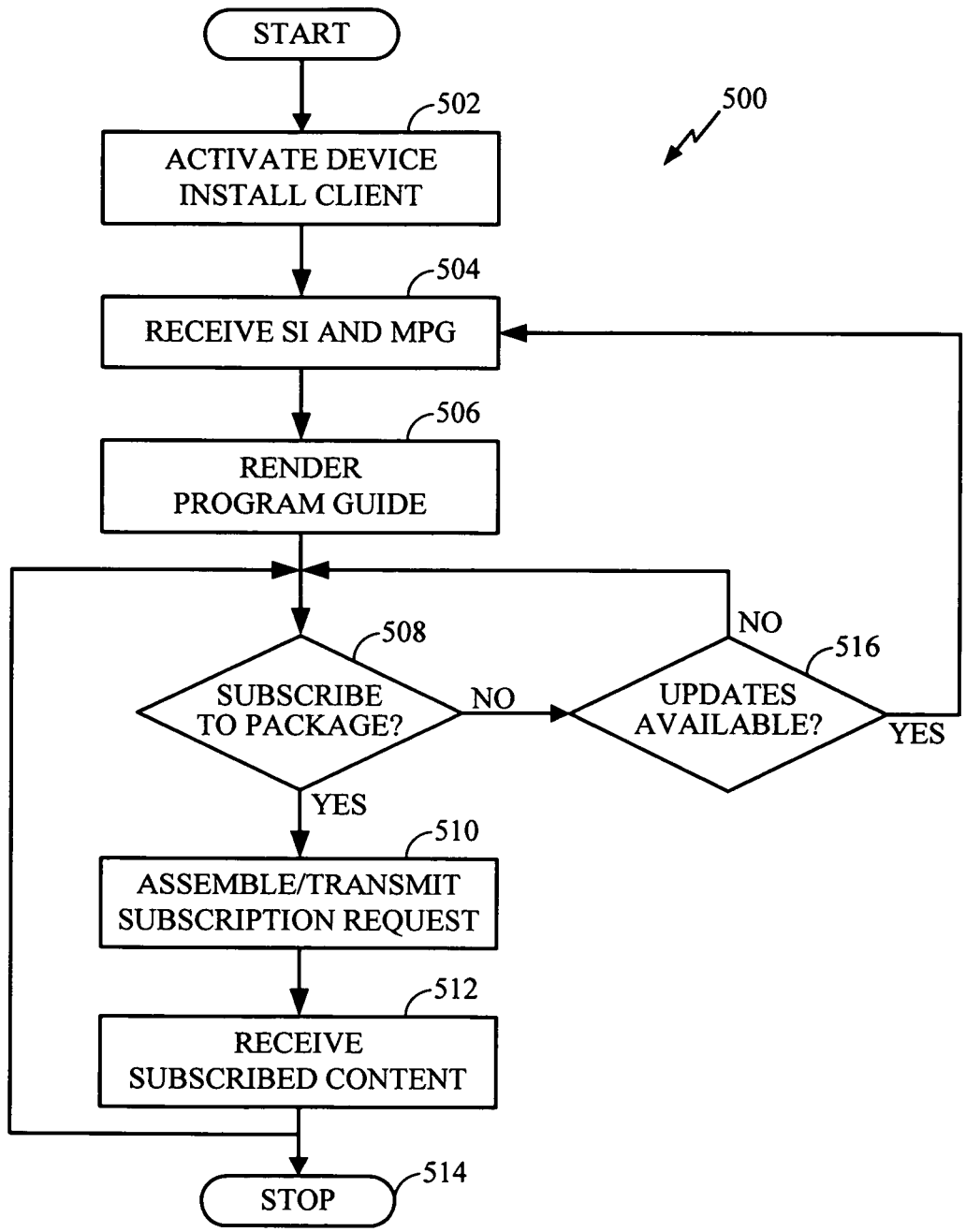
FIG. 5 shows an embodiment of a method for operating a device in an embodiment of a distribution system.

FIG. 5 shows an embodiment of a method 500 for operating a device in one or more embodiments of a distribution system. For clarity, the method 500 will be described with reference to the device 400 shown in FIG. 4. For example, the device 400 is suitable for use as any of the devices (102, 104, 106) shown in FIG. 1. In one or more embodiments, the processing logic 402 executes program instructions to control the device 400 to perform the functions described below.

At block 500, a client 414 is installed on a device. In an embodiment, the client 414 is installed and executes to establish communications with the distribution server using a selected communication protocol.

The device is activated 502 with a distribution server. For example, in an embodiment, the processing logic 402 communicates with a distribution server via the transceiver logic 406 to identify the device and provide any other activation information that may be required.

At block 504, the latest SI and MPG are received at the device. For example the distribution server transmits SI parameters 416 and a MPG 418 to the device, which are then stored in the memory 408.

At block 506, the client installed on the device operates to display or render information from the MPG 418 to the device user. The MPG 418 provides information to the device user about the packages available for subscription. For example, the information includes scheduling, pricing, availability, and any other relevant information. In an embodiment, the client 406 operates to display information from the MPG 418 using I/F logic 404.

At block 508, a test is performed to determine if the user wishes to subscribe to one or more available packages. For example the user may select one or more packages from the displayed program guide and request to subscribe to those packages. If the user selects any package for subscription, the method proceeds to block 510. If the user does not select any packages for subscription, the method proceeds to block 516.

At block 516, a test is performed to determine if there is updated information for the SI or MPG parameters. For example, in an embodiment, the processing logic 402 listens to transmission from the distribution server to determine if the version of the currently broadcast parameters is different than the parameters that are stored in the device memory 408. If new parameters are available the method proceeds to block 504 to obtain the new information. If no new parameters are available, the method proceeds to block 508 to determine if the device user wishes to subscribe to any available package.

At block 510, a subscription request is assembled and transmitted to the distribution network. The subscription request allows the device user to subscribe to the selected packages. For example, the subscription request is assembled in a format that allows one or more packages to be identified for subscription. In an embodiment, the client 414 operates to assemble the subscription request. The subscription request is then transmitted to the distribution server using the transceiver logic 406.

At block 512, services associated with the requested package are received at the device. For example, after the distribution server has processed the subscription request, the services associated with the subscribed package are delivered to the device. For example, in an embodiment, the services are delivered to the device from a content provider through the distribution network and received by the transceiver logic 406. The method then stops at block 514.

Thus, the method 500 operates to allow a device to subscribe to one or more packages provided in a distribution system. It should be noted that the method 500 illustrates just one implementation and that changes, additions, or rearrangements of the functional elements may be made without deviating from the scope of the described embodiments.

System Information

The following is a detailed description of SI parameters generated in one or more embodiments of a distribution system. In one or more embodiments, the SI parameters are formatted into structures that allow the delivery of customer care and billing and possibly other services to be separated from the retailing of content or other services. These structures allow the BCS providers to control which content packagers provide services to its associated devices, but the BCS providers may not be in control of either the content or the pricing. Provisions are made to allow the BCS providers to sell content and additional services in addition to the initial service contract. The structure of the service offerings from each of the content packagers is such that the offerings can be displayed on a single user interface with a consistent display order. This defined ordering is for the subscription packages that are available across multiple content packagers, which may be associated with multiple and/or different BCS providers.

System Information structures allow the BCS providers control over which content packagers are available to its associated devices. Cost and terms for each content packager is independent of the BCS provider. The content and subscription options described by each content packager is independently defined, but can be merged into a single user interface. In an embodiment, this is accomplished through records in the SI as described in the following SI specification. It should be noted that the modifications, changes, deletions, additions, combinations or other minor variations to the described SI are within the scope of the embodiments.

SI Message Specifications

Figure 6:
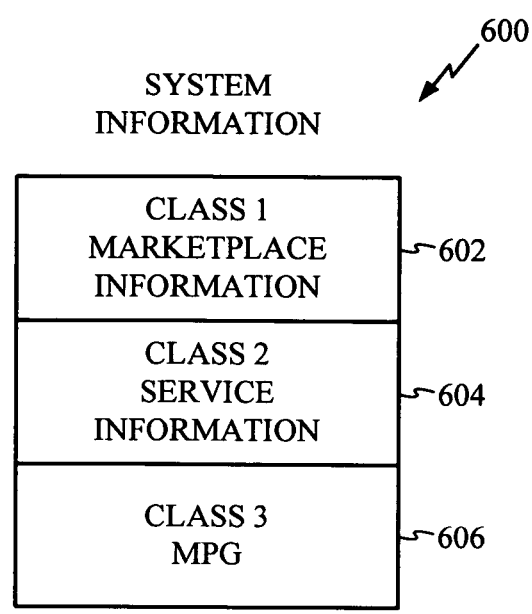
FIG. 6 shows an embodiment of an SI structure for use in an embodiment of a distribution system.

FIG. 6 shows an embodiment of an SI structure 600 for use in an embodiment of a distribution system. In one or more embodiments, the SI information is transmitted as a set of SI messages. The following sections specify the definition, semantics and associated processing of SI information contained in the SI messages. In an embodiment, the SI messages are organized into marketplace information 602, service information 604, and a MPG 606 as follows.

Class 1. Marketplace Information that is related to the packaging of service offerings to which a user may subscribe.

Class 2. Service Information that provides information about the attributes of the available services and their location within the distribution network.

Class 3. Media Presentation Guide information that provides information about individual presentations on a service.

Common Formating and Processing

SI Message Syntax

In one or more embodiments, the structures of the SI Messages are defined as a set of XML schema conformant to XML 1.0.

Identification of SI Message Versions

Each transmitted SI message contains a version attribute, which distinguishes copies of different SI messages of the same message type. For certain types of SI messages the version may also distinguish SI messages with the same value of a specified attribute, called the Distinguishing Attribute. For example, the Distinguishing Attributes for two messages are as follows:

Marketplace Content Packager Message: Content Packager ID

MPG Title Block Message: MPG Block Start Time.

The value of the version attribute may be the same for all SI messages representing a single set of element and attribute values. The value of the version attribute may be incremented when any attribute or element of the SI message, other than the Distinguishing Attribute, is modified or created.

In an embodiment, the version attribute is an unsigned integer. The size of the attribute depends on the type of SI message, as specified for the individual message types. Once the version has changed, the value of the version associated with that version of the SI message may not be reused for a time T_UPDATE. The value of T_UPDATE may be in units of seconds, and in an embodiment, is a configurable system parameter.

Identification of Current SI Message Versions

The values of the version field for the current versions of SI messages are sent over the distribution network in a primary Flow.

Update of SI Message Versions

If an SI message contains an update to an attribute or element value, or a new instance of an element, that is scheduled to take effect at a future time, the message may contain a Validity Time value associated with the element being updated, as specified for individual elements. If two versions of an element are being transmitted simultaneously in different Message versions (typically, the current and next versions), each version is associated with a Validity Time. The Validity Time attribute may be a 32-bit count of seconds.

Class 1: Marketplace Information

In one or more embodiments, the SI provides marketplace information in two message types described as follows.

1. Marketplace Common Messages

2. Marketplace Content Packager Messages

1. Marketplace Common Message

Figure 7:
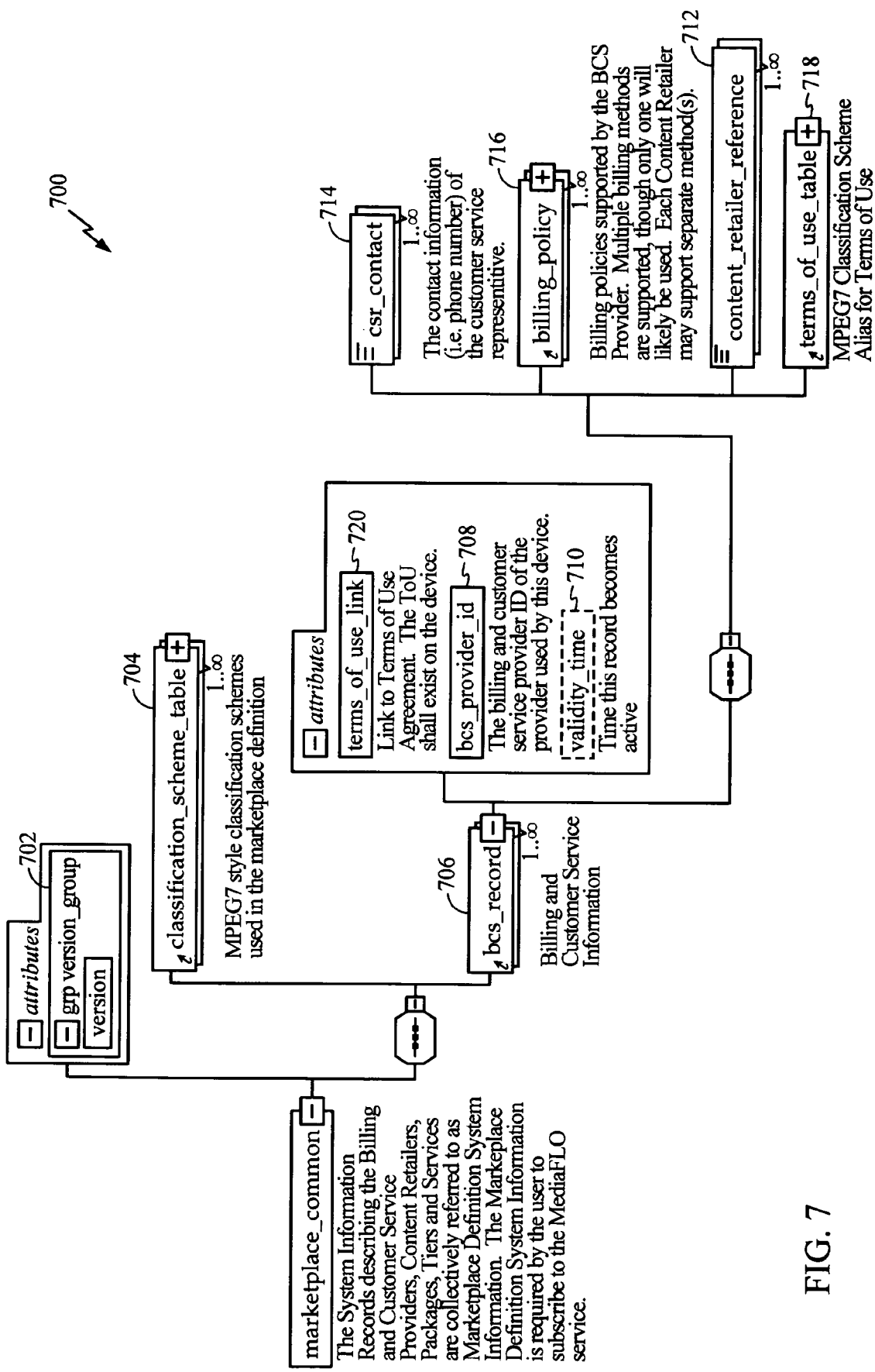
FIG. 7 shows an embodiment of a Marketplace Common message schema for use in an embodiment of a distribution system.

FIG. 7 shows an embodiment of a Marketplace Common message schema 700 for use in an embodiment of a distribution system. In one or more embodiments, the Marketplace Common message defines marketplace information that is not specific to any content packager. The Marketplace Common message defines the attributes of the BCS providers configured within the distribution network, references to content packagers associated with each BCS provider, and classification schemes for the controlled terms.

Version

The Marketplace Common message comprises a unique version 702 identified by the value of a version attribute. In an embodiment, the version attribute is a 16-bit unsigned integer.

Classification Scheme Tables

The Marketplace Common message 700 comprises classification scheme tables 704 that define classification schemes used by all BCS providers in the network to specify the following.

Billing Environment
Service Account Type
Currencies
Subscription Method
Genre
MIME type
Rating levels
Device Class The Classification Scheme Table 704 may comprise any suitable structure. In an embodiment, the definitions of Classification Scheme Table 704 are subject to the requirements and capabilities of the BCS provider and the regulatory requirements that the BCS provider is subject to.

BCS Record

The Marketplace Common message 700 comprises a BCS Record 706 for each BCS provider in the distribution network. In an embodiment, the BCS Record 706 defines a BCS provider and supplies the following items.

BCS Provider ID
Validity Time
CSR Contact
Billing Policy
Content Packager Reference
Terms of Use Table
Terms of Use Link BCS Provider ID The BCS provider ID 708 attribute is a globally unique ID associated with an individual BCS provider. In an embodiment, the BCS provider ID 708 may be an unsigned 16-bit integer.

Validity Time

The Validity Time attribute 710 defines a time at which the definition provided in the BCS Record 706 shall become valid, superseding the previous definition. If the Validity Time is absent or it refers to a time in the past, the BCS Record 706 is current. In an embodiment, the Validity Time attribute 710 may be a 32-bit count of seconds elapsed since 00:00:00 on 6 Jan. 1980UTC.

A BCS record 706 may define one Validity Time. The Validity Time shall be present when multiple records appear for the same BCS provider. In this case, both the current and future record definition contain the Validity Time attribute, with the appropriate value for the record. The validity time may also be present for records defining BCS providers that are not yet active.

Content Packager Reference

The Content Packager Reference 712 is a list of Content Packager IDs identifying Content Packagers associated with the BCS provider. A subscriber associated with the BCS provider may only subscribe to packages offered by Content Packagers included in the Content Packager Reference 712. The Content Packager Reference 712 contains at least one Content Packager ID.

CSR Contact

The CSR Contact 714 element describes possible ways to contact the customer service representatives for the BCS. The BCS Record 706 provides at least one CSR contact 714. Each CSR Contact may be a URI. The following examples show how different classes of URI may be used for a CSR contact 714.

TEL:URI defines a telephone number the subscriber may call for customer assistance.
MAILTO:URI specifies an email address the subscriber may use for customer assistance.
HTTP:URI specifies a web site the subscriber may use for customer assistance.

Billing Policies

The Billing Policy 716 specifies a billing policy supported by the BCS provider on behalf of Content packagers. Each BCS provider supports at least one Billing Policy 716. In an embodiment, the Billing Policy 716 comprises a Billing Environment and Service Account Type attributes.

a. Billing Environment

The Billing Environment indicates the particular type of device to which a billing policy applies. Examples of Billing Environment which may be supported include "BREW", "payPal".

b. Service Account Type

The Service Account Type indicates the identifier used for the service account billing ID. Examples of Service Account Type which may be supported include "MIN", "MDN", "BREW SID", "Credit Card", and "Prepay".

Terms of Use Table

The Terms of Use Table 718 is provided that represents a classification scheme used by the BCS provider to define controlled terms for accessing Terms of Use associated with the BCS provider.

Terms of Use Link

The Terms of Use Link 720 is provided that is a reference to an URI that identifies the location of a Terms of Use which the BCS provider requires a user to agree to before providing the user with access to packages offered by the content packager if the content packager does not provide end user license agreement (EULA) information.

2. Marketiplace Content Packager Message

Figure 8:
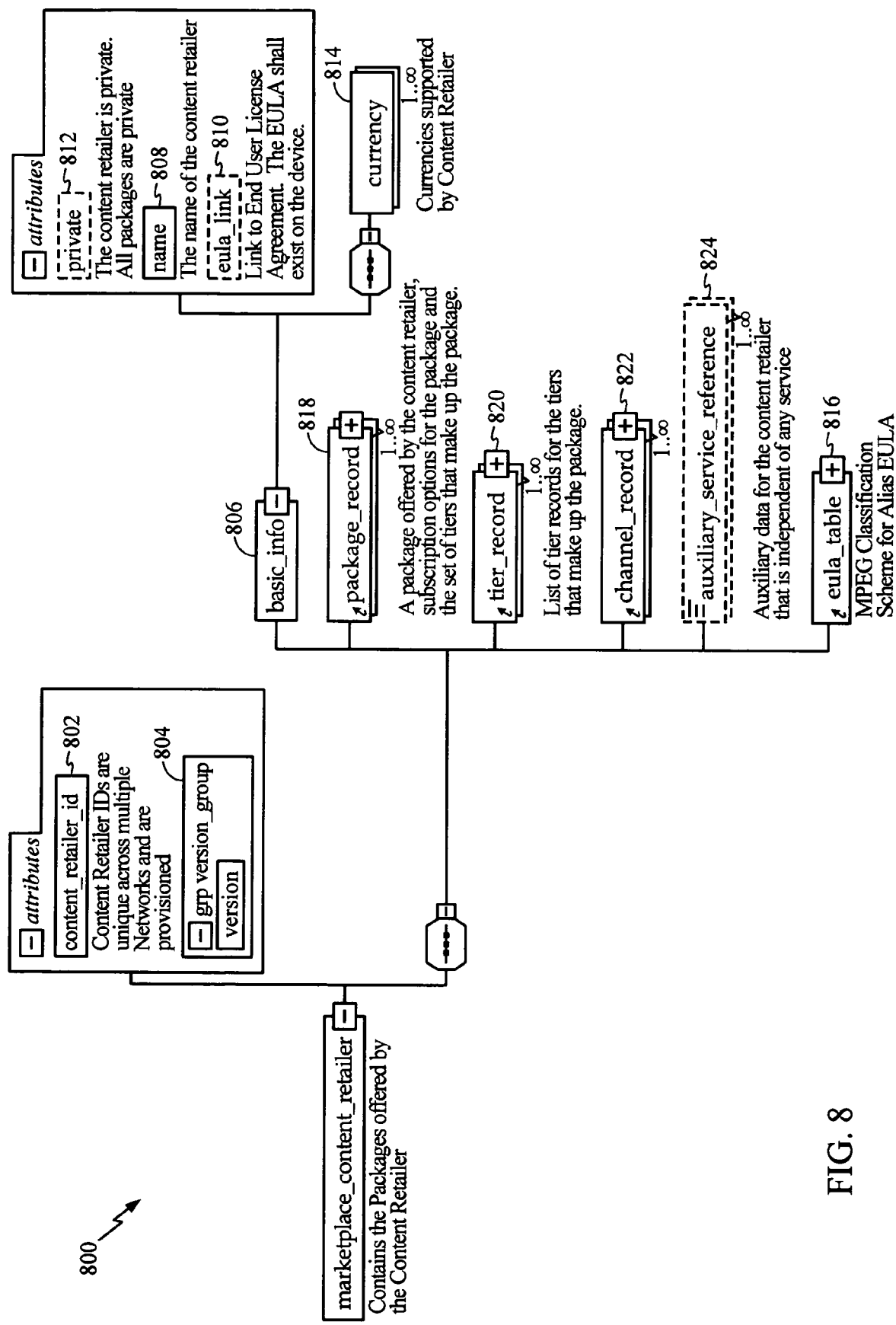
FIG. 8 shows an embodiment of a Marketplace Content Packager message 800 schema for use in an embodiment of a distribution system.

FIG. 8 shows an embodiment of a Marketplace Content Packager message 800 schema for use in an embodiment of a distribution system. In an embodiment, information specific to a content packager is sent in the Marketplace Content Packager message 800. Each version of a Marketplace Content Packager message 800 is uniquely identified by the values of its Content Packager ID 802 and version attribute 804. In an embodiment, the version attribute 804 is a 16-bit unsigned integer. The Marketplace Content Packager 800 message contains the following elements.

Content Packager ID
Basic Info
EULA Table
Package records
Tier records
Channel records
Auxiliary service references Content Packager ID Each Content Packager is uniquely distinguished from all other Content Packagers in the distribution network by a Content Packager ID 802. The Content Packager is associated with at least one BCS provider. In an embodiment, the Content Packager ID 802 is an unsigned 16 bit integer.

Basic Info

In an embodiment, a Basic Information 806 record provides the following information.

The Content Packager Name.
A link to the content packager EULA.
Private Content Packager Indicator.
Currency Support There shall be one Basic Information 806 record for each content packager.

Content Packager Name

The Content Packager Name 808 is a string that may be used to identify the content packager to a user. The Content Packager Name 808 is unique among content packagers carried in the distribution network.

EULA Link

The EULA Link 810 is a reference to a URI that identifies the location of a EULA which the content packager may require a user to agree to before providing the user with access to packages offered by the content packager. In an embodiment, the EULA Link 810 is optional. If the content packager does not provide one, the BCS provider Terms of Use Table 718 for the BCS provider associated with the user may be used.

Private Content Packager

The Basic Information record 806 may specify that the content packager is a Private Content Packager 812. The means by which a user subscribes to packages offered by a private content packager 812 are beyond the scope of this document.

Currency Support

The Basic Information record 806 shall specify a Currency 814 element, which defines a list of the currencies that may be used by the content packager to set pricing for packages.

EULA Table

The EULA Table 816 is a classification scheme table used by the content packager to define terms for accessing the EULA associated with the content packager. In an embodiment, the EULA table 816 is optional. If the content packager does not provide one, the BCS provider Terms of Use Table 718 for the BCS provider associated with the user may be used.

Package Records

The Marketplace Content Packager message 800 includes at least one Package Record 818. The Package Record 818 defines a set of content offerings available through the content packager, and certain associated attributes. A more detailed description of the Package Record 818 is provided in another section of this document.

Tier Record

The Marketplace Content Packager message 800 includes a Tier Record 820 for each Tier referenced by any package. The Tier Record 820 defines a tier, which refers to a group of channels. There is a Tier Record 820 for each tier used by the content packager. In an embodiment, the Tier Record 820 specifies the following information.

- The Tier ID
- The Validity Time of the Record
- The set of Channels included in the Tier.
- The set of Auxiliary Services added to the Tier Tier ID The Tier ID is an identifier that uniquely distinguishes the tier from all other tiers offered by the same content packager. In an embodiment, the Tier ID is an unsigned 16-bit integer.

Tier Validity Time

The Validity Time attribute defines a time at which the definition provided in the Tier Record 820 shall become valid, superseding the previous definition. If the Validity Time is absent or it refers to a time in the past, the Tier Record 820 is current. In an embodiment, the Validity Time attribute is a 32-bit count of seconds elapsed since 00:00:00 on 6 Jan. 1980UTC.

The Tier Record 820 may define one Validity Time. The Validity Time is present when multiple records appear for the same Tier. In this case, both the current and future record definitions contain the Validity Time attribute, with the appropriate value for the record. The validity time is also present for records defining Tiers that are not yet active.

Channel References

The Tier Record 820 specifies a list of channel references that describe the channels in the tier offering. The channels are defined in the Channel Record associated with the content packager. The Tier Record 820 contains at least one channel reference.

Auxiliary Service References

The Tier Record 820 specifies the list of service identifiers for Auxiliary Services associated with this Tier. A device subscribed to packages that include the Tier shall acquire any material downloaded through Auxiliary Services while it is active.

Channel Record

The Marketplace Content Packager message 800 includes a Channel Record 822 for each channel referenced by any Tier. The Channel Record 822 defines a channel, which is a customization of a service for the content packager. In an embodiment, the Channel Record 822 is comprised of the following elements.

- Channel ID
- Channel Validity Time
- Channel Weight
- Channel Language-specific Data
- Base Service
- Auxiliary Services
- Channel Icon Channel ID The Channel ID is an identifier that uniquely distinguishes the Channel from other Channels offered by the same Content Packager. In an embodiment, the Channel ID is an unsigned 16-bit integer.

Validity Time

The Validity Time attribute defines a time at which the definition provided in the Channel Record 822 shall become valid, superseding the previous definition. If the Validity Time is absent or it refers to a time in the past, the Channel Record is current. In an embodiment, the Validity Time attribute is a 32-bit count of seconds elapsed since 00:00:00 on 6 Jan. 1980 UTC.

A Channel Record 822 may define at most one Validity Time. The Validity Time shall be present when multiple records appear for the same Channel. In this case, both the current and future record definition shall contain the Validity Time attribute, with the appropriate value for the record. The validity time shall also be present for records defining Channels that are not yet active.

Channel Weight

Each Channel Record 822 shall assign a Channel Weight to the Channel. In an embodiment, the Channel Weight is an unsigned integer. The Channel Weight is used by the device to determine the order in which channels are presented to the user when displaying the MPG. In an embodiment, channels with the lower weight are presented first. Alternatively, channels with the higher weight are presented first.

The Channel Weight is unique amongst all Channels offered by all Content Packagers over all Multiplexes associated with the BCS provider. There is one Channel Weight associated with each Channel Record 822.

Channel Language-specific Data

The Channel Language Specific Data element specifies a Name and Description of the channel associated with a specific language, and may define URLs where the user can obtain further information about the channel.

Each Channel record 822 may contain one or more Channel Language-specific Data Elements. If a Channel Language-specific Data Element is present, its content supersedes the Service Language-specific Data Element for the Base Service in the same language. If there is no Channel Language-specific Data Element in a given language, the device may use the Service Language-specific Data Element for the Base Service in that language. Each Channel record 822 shall contain a Channel Language-specific Data Element per Channel Language.

Base Service Record

The Channel Record 822 specifies a Base Service Record. The Base Service Record identifies the Base Service for the Channel, and certain optional characteristics that are Channel-specific:

Base Service Identifier
Excludability.
Channel-specific Capability Requirements

Base Service Identifier

The Base Service Record specifies a Base Service Identifier. The Base Service identifier is the service identifier for the Service that the channel customizes.

Auxiliary Services

The Channel Record 822 may define a list of Service Identifiers for Auxiliary Services associated with this channel. The device shall acquire any material downloaded through the Auxiliary Services while it is accessing the channel.

Channel Icon

The Channel Record 822 may provide a channel Icon element that can be used to identify the channel in a display of the MPG to the user. If present, the channel Icon is used in place of the Service Icon. The Channel Icon may be a reference to a resource that defines an icon for the channel, or an actual Icon of a defined MIME type.

Auxiliary Service References

The Marketplace Content Packager message 800 may include a list of auxiliary service references 824 for auxiliary services associated with this content packager. The user shall be automatically subscribed to the listed services if the user subscribes to any package associated with the content packager. The device shall acquire any material downloaded through the auxiliary services while it is active.

Figure 9:
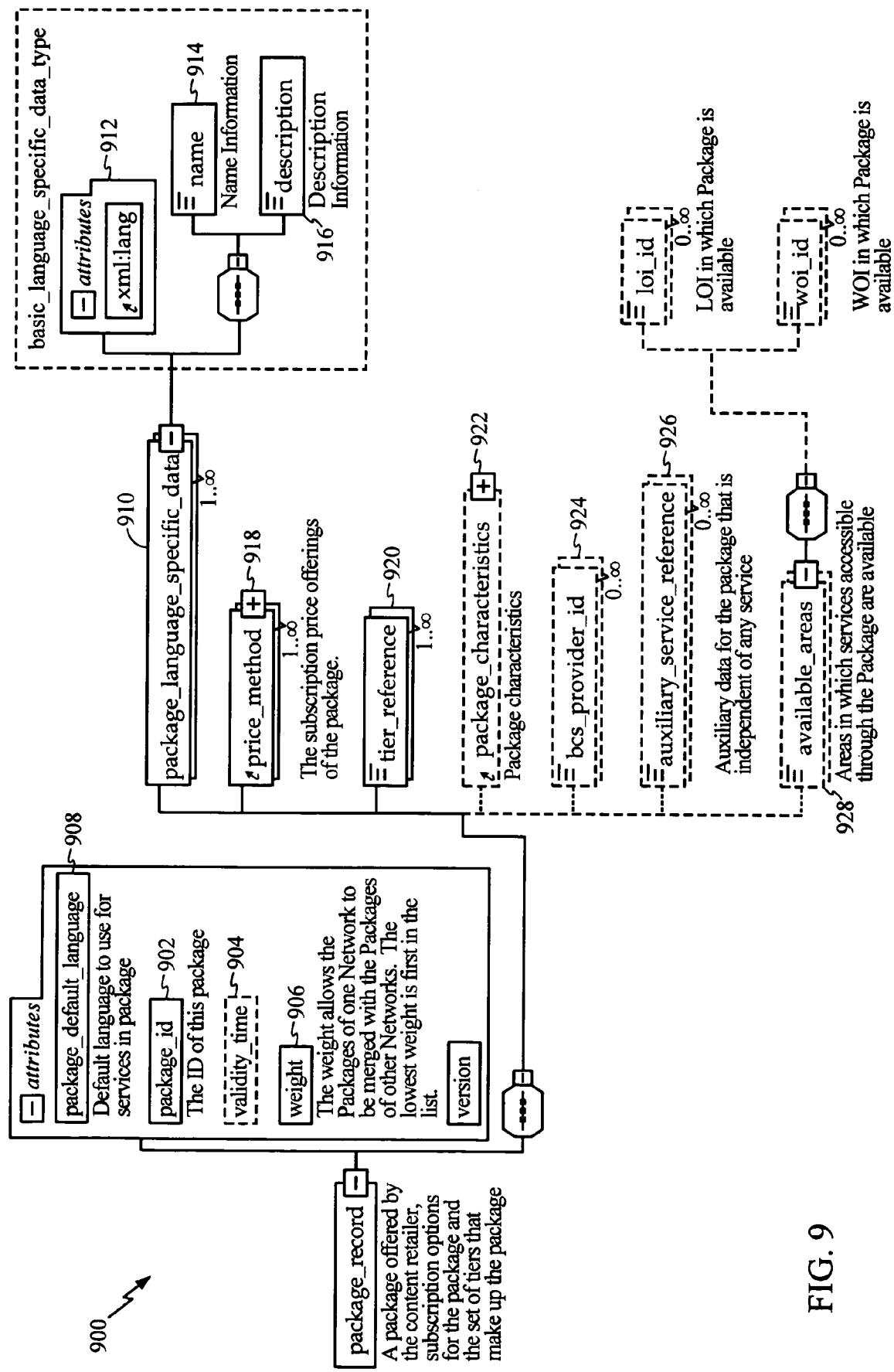
FIG. 9 shows a detailed diagram of an embodiment of a package record schema for use in a Marketplace Content Packager message in an embodiment of a distribution system.

FIG. 9 shows a detailed diagram of an embodiment of a package record schema 900 for use in a Marketplace Content Packager message in an embodiment of a distribution system. The package record schema 900 defines a set of content offerings available through the content packager, and certain associated attributes as follows.

Package ID
Package Validity Time
Package Weight
Package Default Language
Language-specific Data
Package Pricing and subscription methods
BCS Provider IDs associated with the Package
Tiers associated with the Package
Package Characteristics
Auxiliary Services associated with the Package
Available Areas Package ID The Package ID 902 is an identifier that distinguishes a particular package from other packages offered by the same content Packager. In an embodiment, the Package ID 902 is an unsigned 16-bit integer. There is one Package ID 902 associated with each package.

Validity Time

The Validity Time attribute 904 defines a time at which the definition provided in the Package Record 900 shall become valid, superseding the previous definition. If the Validity Time 904 is absent or it refers to a time in the past, the Package Record 900 is current. The Validity Time attribute is a 32-bit count of seconds elapsed since 00:00:00 on 6 Jan. 1980UTC.

A Package Record may define at most one Validity Time. The Validity Time shall be present when multiple records appear for the same package. In this case, both the current and future record definition shall contain the Validity Time attribute, with the appropriate value for the record. The validity time shall also be present for records defining packages that are not yet active.

Package Weight

Each Package Record 906 assigns a Package Weight to the package. The Package Weight is an unsigned integer. The Package Weight is used by the device to determine the order in which packages are presented to the user. In an embodiment, packages with the lower weight are presented first. Alternatively, packages with the higher weight are presented first.

The Package Weight is unique amongst all packages offered by all content packagers over all multiplexes associated with the BCS provider. There is one Package Weight associated with each Package Record 900.

Package Default Language

The Package Record 900 specifies a Default Language attribute 908. The Default Language attribute 908 specifies the language of the service that will be provided by default to the user if the user's preferred language is not available, unless otherwise overridden. A Package Default Language will be provided if any service which can be accessed through the package supports more than one language.

Package Language-specific Data

The Package Language Specific Data element 910 specifies a name and description of the package associated with a specific language. Each package record contains at least one Package Language-specific Data Element 910. Each package record contains at most one Package Language-specific Data Element per Package Language.

a. Package Language

The Package Language attribute 912 specifies the language of the Package Language Specific Data element 910. Packages that provide descriptions in more than one language specify which language is the default language to use if no language preference is defined on the device.

b. Package Name

The Package Name attribute 914 is a string that specifies a name for the package that may be displayed to the user.

c. Package Description

The Package Description attribute 916 is a string that specifies a description for the Package that may be displayed to the user.

Price Method

The Price Method 918 of a package specifies a cost associated with a given subscription method for the package. It consists of a Subscription Method, a Currency and an Amount. The Package Record 900 specifies at least one Price Method 918. The Package Record 900 specifies at most one Price Method per Subscription Method.

a. Subscription Method

The Subscription Method identifies a subscription method (e.g. monthly, weekly) associated with the cost.

b. Currency

The Currency identifies the currency applicable to the Amount. The Currency is a currency listed in the Basic Info record for the Content Packager. At least one BCS provider associated with the content packager shall support all currencies applicable to a package.

c. Amount

The Amount is the actual price of the package in the case of a Root Package, or the incremental price of the Package additional to the price of the Parent Package in the case of an add-on Package. The Amount attribute is a floating point value conforming to the requirements of the associated Currency.

Tier References

The Package Record 900 shall specify the set of Tier Reference elements 920 that describe the package offering. The Tiers are defined in the Tier Record 820 associated with the Content Packager. The Package Record 900 shall contain at least one Tier Reference 920.

Package Characteristics

The Package Characteristics 922 element is an optional element that specifies certain attributes of the package. The element may specify any combination of the following attributes:

Parent Package.
Autosubscribe Package
Closed Package.
Excluded Packages.

a. Parent Package

The Package Characteristics 922 element may specify a list of one or more Package IDs representing parent packages. If the package is associated with a Parent Package then the package is an "add-on" package, and the user may only subscribe to the package if the user is already subscribed to at least one package among the parent packages. If no parent packages are listed then the package is defined to be a "Root" package.

b. Autosubscribe Package

If the Package is a Root Package, the Package Characteristics 922 element may specify the Autosubscribe attribute to cause the user to be automatically subscribed to the package.

c. Closed Package

The Package Characteristics 922 element may specify the Closed attribute to indicate that new subscriptions are no longer being accepted for the package.

d. Excluded Packages

The Package Characteristics 922 element may specify a list of one or more Package IDs representing Excluded Packages. A user subscribed to the package specified in the Package Record shall not be permitted to subscribe to any package in the list of Excluded Packages. It is the responsibility of the content packager to define relationships between packages in such a way that the user will not be offered the package if s/he is already subscribed to a package in the Excluded Packages list.

BCS Provider References

The Package Record 900 may specify a list of BCS Provider References 924 associated with the Package. The BCS Provider Reference 924 identifies a BCS provider. Only BCS providers associated with the content packager may be included in the list. If the list is provided then only users associated with an identified BCS provider are permitted to subscribe to the package. If the list is not provided then users associated with any BCS provider that is also associated with the content packager are permitted to subscribe to the package.

Auxiliary Service References

The Package Record 900 may include a list of Auxiliary Service References 926 for Auxiliary Services associated with this Package. The device subscribed to the package shall acquire any material downloaded through the Auxiliary Services while it is active.

Available Areas

The Package Record 900 may include an Available Areas element 928 comprising of a list of local (LOI) and wide area (WOI) operations infrastructure. The list indicates WOIs and LOIs in which at least one service offered as a channel through the package may be accessed. In an embodiment, the LOI and WOI are 16-bit unsigned integers that uniquely identify a geographical region.

Class 2: Service Information

In one or more embodiments, the SI provides service information in a single message referred to as a Service Definition Message.

Service Definition Message

Figure 10:
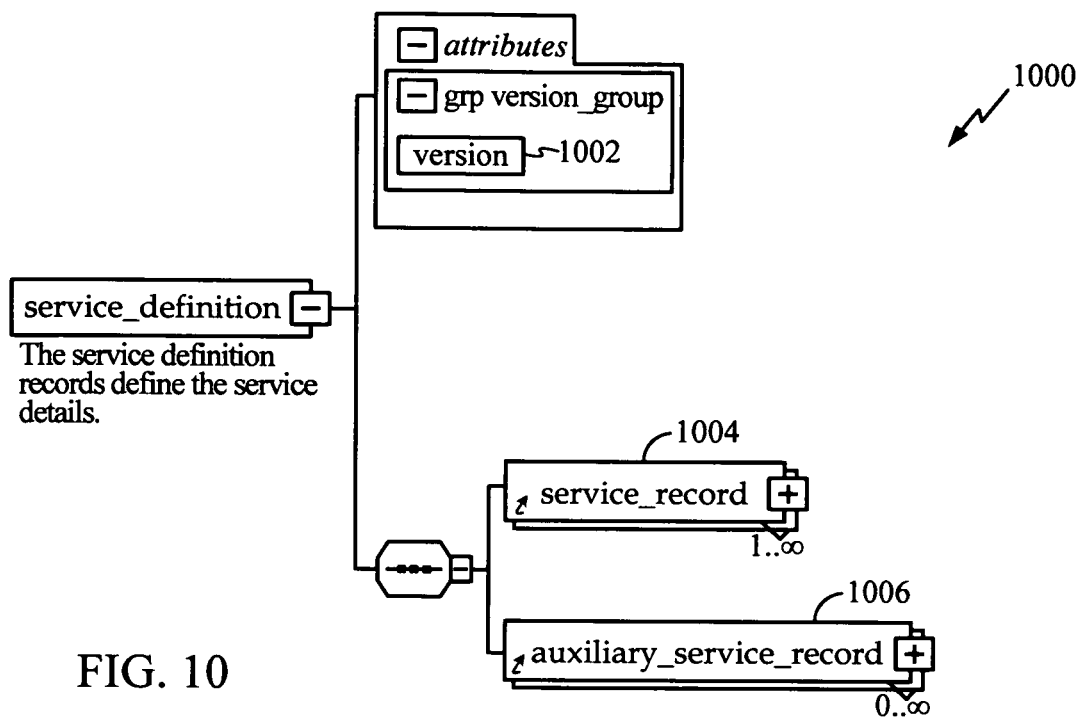
FIG. 10 shows an embodiment of a service definition message schema for use in an embodiment of a distribution system.

FIG. 10 shows an embodiment of a service definition message 1000 schema for use in an embodiment of a distribution system. The service definition message 1000 defines those content attributes of a service which are shared between channels offered by different content packagers that use the service as a base service. It also defines default content attributes that may be used in the event that a content packager does not define customized values for the corresponding attributes in the channel definition record.

The service definition message 1000 defines those content attributes of an auxiliary service which are shared between channels offered by different content packagers that use the auxiliary service. Auxiliary services may be Non Real Time Services. They may be used by the content packager to build up a cache of material such as advertisements, barkers, intros, and outros that can be used to customize the channels defined for the content packager.

Version

The service definition message 1000 comprises a version 1002 that is uniquely identified by the value of its version attribute. In an embodiment, the version attribute is a 16-bit unsigned integer.

Service Record

The Service Definition message 1000 comprises one or more Service Records 1004.

Auxiliary Service Records

The Service Definition message 1000 may comprise one or more Auxiliary Service Records 1006. In an embodiment, there is one Auxiliary Service Record for each auxiliary service offered by the distribution network. The Auxiliary Service Record 1006 comprises the following information.

Figure 11:
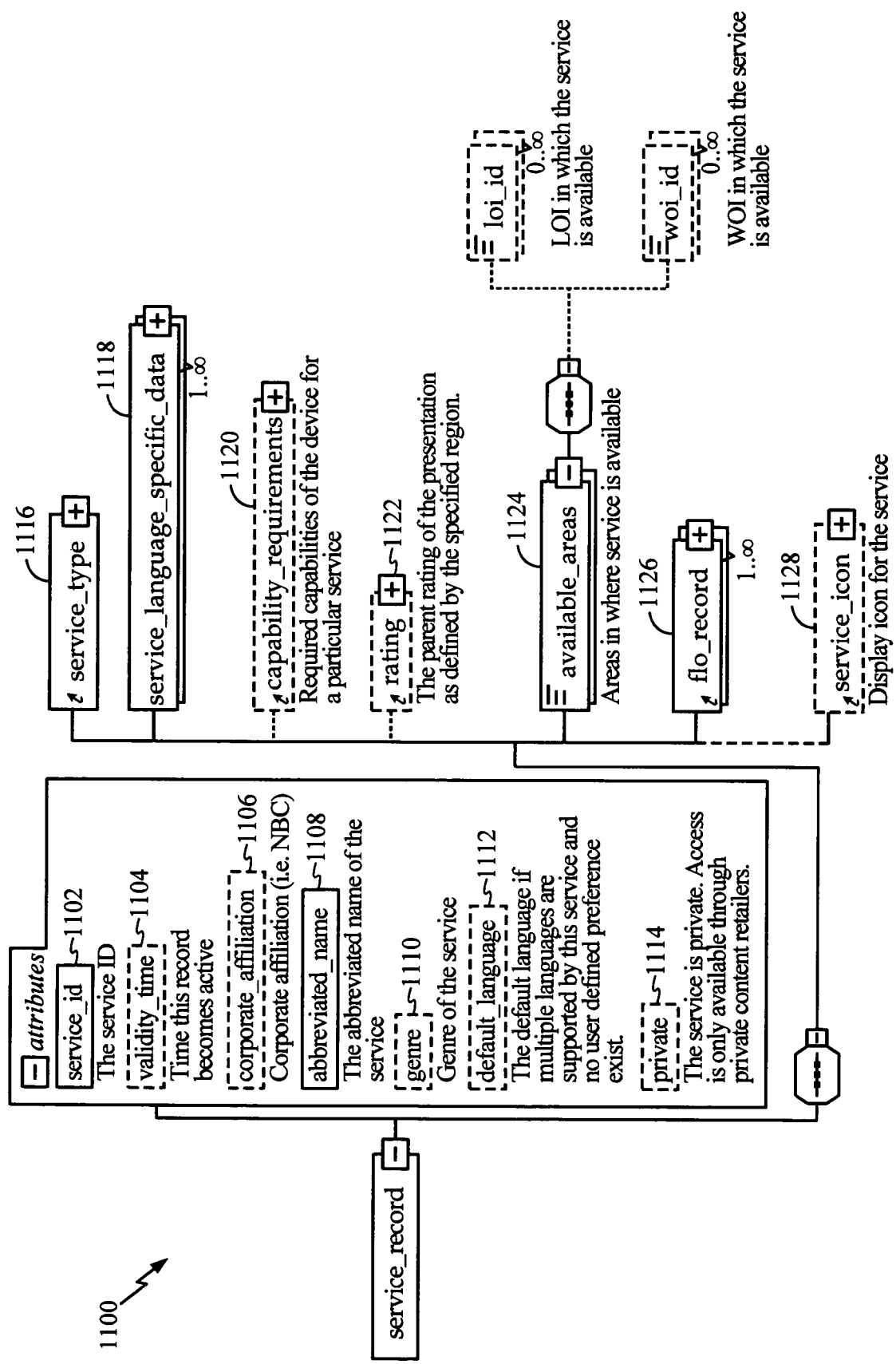
FIG. 11 shows an embodiment of a service record schema for use in an embodiment of a distribution system.

Auxiliary Service ID
Auxiliary Service Validity Time
Auxiliary Capability Requirements
Auxiliary Flow Records Service Record FIG. 11 shows an embodiment of a service record 1100 schema for use in an embodiment of a distribution system. For example, the service record 1100 is suitable for use as the service record 1004. In an embodiment the SI from the distribution network provides one service record for each service offered. The Service Record 1100 comprises of the following information.

Service ID
Validity time
Corporate Affiliation
Abbreviated Name
Service Genre
Default Language
Private Service
Service Type
Service Language Specific Data
Capability Requirements
Ratings
Available Areas
Flow Records
Service Icon Service ID The Service Record 1100 provides a Service ID 1102. The Service ID 1102 is an identifier that uniquely distinguishes the service from other services and auxiliary services transported in the same Multiplex.

In an embodiment, the Service ID 1102 is a 16-bit hexadecimal integer. The value of a Service ID 1102 for a service used to transport IP Datacast services may be equal to the destination IP Address.

Validity Time

The Validity Time 1104 defines a time at which the definition provided in the Service Record 1100 shall become valid, superseding the previous definition. If the Validity Time is absent or it refers to a time in the past, the Service Record is current.

In an embodiment, the Validity Time 1104 is a 32-bit count of seconds elapsed since 00:00:00 on 6 Jan. 1980 UTC.

The Service Record 1100 may define at most one Validity Time. The Validity Time is present when multiple records appear for the same service. In this case, both the current and future record definition shall contain the Validity Time parameter, with the appropriate value for the record. The validity time is also present for records defining Services that are not yet active.

Corporate Affiliation

The Service Record 1100 provides a Corporate Affiliation 1106. The Corporate Affiliation parameter is a string that defines the corporate name for the service. Multiple services may share the same value of Corporate Affiliation.

Abbreviated Name

The Service Record 1100 provides an Abbreviated Name 1108. The Abbreviated Name parameter 1108 is a string that defines a short name for the service that may be displayed to the user. Each service has an Abbreviated Name that is unique within any Multiplex transporting the Service.

Genre

The Service Record 1100 provides a Genre parameter 1110. The Genre parameter 1110 is a reference that describes the semantic class of content provided by the service.

Default Language

The Service Record 1100 provides a Default Language parameter 1112. The Default Language parameter 1112 specifies the language of the service that shall be provided by default to the user if the user's preferred language is not available, unless overridden by the default language of the Package Record. The Default Language shall be provided if the service supports more than one language.

Private Service

The Service Record 1100 may specify that the service is private using the Private parameter 1114. Access to a private service may be offered through a Private content packager. Information about a private service, including the existence of the service, may not be disclosed to users who are not permitted to access at least one private content packager that offers access to the service.

Service Type

The Service Record 1100 provides a Service Type parameter 1116. The Service Type parameters 1116 indicate the temporal nature of the content provided by the service. There are four possible Service Types: Real Time, Non-real Time, "Per MPG" or IP Datacast.

a. Real Time Service

All content on a Real Time Service consists of Real Time streaming media.

b. Non Real Time Service

All content on a Non Real Time Service consists of non-Real Time media downloaded as clip files.

c. Per MPG Service

Content on a "Per MPG" Service may comprise Real Time streaming media, non-Real Time media, or a mixture of the two, as determined from the Media Presentation Guide (MPG).

d. IP Datacast Service

The content of an IP Datacast Service consists of one or more Flows transporting generic IP packets. Each Flow supporting the IP Datacast Service transports IP packets for a specific IP Multicast Address and Port. Each IP Address is associated with at least one MIME Type.

The Service Type parameter 1116 for an IP Datacast Service provides either all IP Addresses and ports associated with the service or none. If no IP Address is provided, the structure and contents of the IP Datacast Service is determined by any suitable means.

Service Language Specific Data

The Service Record 1100 provides at least one Service Language Specific Data parameter 1118. The Service Language Specific Data parameter 1118 specifies the Name and Description of the service associated with a specific language. There also exists a Service Language Specific Data parameters for the Default Language supported by the service Capability Requirements The Service Record 1100 provides Capability Requirements 1120 for the service if the service is not a Real Time Service. If the device does not meet the Capability Requirements 1120 for subscribed users and the channel using the service is not excludable then the user may not be permitted to subscribe to the package containing the channel. In an embodiment, the Capability Requirements 1120 comprise one or more storage requirements that specify the maximum amount of memory required for a device, in units of kilobytes, to support access to the service for a subscribed user.

Rating

The Service Record 1100 provides one or more Ratings 1122 for the service. The Rating defines the parental advisory information for this Service. It typically corresponds to an average or typical Rating level for MPG Titles offered on the Service. The Rating 1122 comprises a Rating Region that specifies the geographical region in which the Rating applies. There may be a separate Rating for each Rating Region in which the service is offered. There shall be at most one Rating for each Rating Region in which the service is offered.

Available Areas

The Service Definition Record 1100 comprises an Available Areas element 1124 that comprises a list of LOI and WOI identifiers. The list indicates WOIs and LOIs in which the service may be accessed. There is at least one LOI or WOI ID in the Available Areas element 1124. In an embodiment, the LOI and WOI identifiers are 16-bit unsigned integers that uniquely identify a geographical region.

Flow Record

The Service Record 1100 provides one Flow Record 1126 for each Flow used to transport a component of the service. The Flow Record 1126 is comprised of the following information.

Flow ID
    Flow Routing Type
    Flow MIME Type
    Flow Language
    Flow Configuration Flags
    IP Datacast Specification.

Service Icon

The Service Record 1100 provides a Service Icon parameter 1128 that can be used to identify the service in a display of the MPG to the user. The Service Icon parameter 1128 may be a reference to a resource that defines an icon for the service, or an actual Icon of a defined MIME type.

Class 3: Media Presentation Guide Information

The Media Presentation Guide (MPG) provides information about the contents of the channels which may be displayed to the user or downloaded to the device. The contents of a given channel are divided by time into semantically coherent units which share a common MPG Title. The MPG Title is associated with the Base Service for the channel.

In an embodiment, the MPG provides MPG Title Records for all services available in a particular multiplex. The MPG may provide MPG Title Records for services available in various Multiplexes in the network.

Therefore various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

Accordingly, while one or more embodiments of a decoding system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method of organizing packages and channels in a wireless device, the method comprising:
   receiving a plurality of packages in the wireless device, at least one package having an associated weight, wherein each package has a set of associated channels; and
   ordering the plurality of packages in the wireless device in a list for display based on the associated weight.

2. The method of claim 1, wherein the associated weight is an associated channel weight, further comprising ordering the set of associated channels for a given package based on the associated channel weight.

3. The method of claim 2, further comprising applying a function to a channel based on the associated channel weight.

4. The method of claim 3, further comprising applying a condition to a channel based on the associated channel weight.

5. The method of claim 2, further comprising applying a condition to a channel based on the associated channel weight.

6. The method of claim 1, wherein the associated weight is an associated package weight, further comprising applying a function to a package based on the associated package weight.

7. The method of claim 6, further comprising applying a condition to a package based on the associated package weight.

8. The method of claim 1, wherein the associated weight is an associated package weight, further comprising applying a condition to a package based on the associated package weight.

9. The method of claim 1, further comprising generating system information parameters including the ordered plurality of packages.

10. The method of claim 1, further comprising:
    displaying each package according to the order of each package.

11. A wireless device, comprising:
    a transceiver configured to receive a plurality of packages, wherein at least one package includes an associated weight;
    a processor configured to order the plurality of packages according to the associated weight and store the plurality of packages as a plurality of ordered package;
    a user interface configured to select a package from the plurality of ordered packages;
    a memory coupled to the processor configured to store the plurality of ordered packages; and
    a display coupled to the processor configured to display the stored plurality of ordered packages according to their order.

12. The device of claim 11, wherein each package has a set of associated channels, the associated weight is an associated channel weight, and the processor is further configured to order the set of associated channels for a given package based on the associated channel weight.

13. The device of claim 12, wherein the processor is further configured to apply a function to a channel based on the associated channel weight.

14. The device of claim 13, wherein the processor is further configured to apply a condition to a channel based on the associated channel weight.

15. The device of claim 12, wherein the processor is further configured to apply a condition to a channel based on the associated channel weight.

16. The device of claim 11, wherein the associated weight is an associated package weight and the processor is further configured to apply a function to a package based on the associated package weight.

17. The device of claim 16, wherein the processor is further configured to apply a condition to a package based on the associated package weight.

18. The device of claim 11, wherein the associated weight is an associated package weight and the processor is further configured to apply a condition to a package based on the associated package weight.

19. The device of claim 11, wherein the processor is further configured to generate system information parameters including the plurality of ordered packages.

20. A wireless device, comprising:
means for receiving a plurality of packages having an associated weight and a set of associated channels; and
means for ordering the plurality of packages in a list for display on the wireless device, according to the associated weight.

21. The wireless device of claim 20, wherein the associated weight is an associated channel weight, further comprising:
means for ordering the set of channels for a given package based on the associated channel weight.

22. The wireless device of claim 21, further comprising:
means for applying function to a channel based on the associated channel weight.

23. The wireless device of claim 22, further comprising:
means for applying a condition to a channel based on the associated channel weight.

24. The wireless device of claim 21, further comprising:
means for applying a condition to a channel based on the associated channel weight.

25. The wireless device of claim 20, wherein the associated weight is an associated package weight, further comprising:
means for applying a function to a package based on the associated package weight.

26. The wireless device of claim 25, further comprising:
means for applying a condition to a package based on the associated package weight.

27. The wireless device of claim 20, wherein the associated weight is an associated package weight, further comprising:
means for applying a condition to a package based on the associated package weight.

28. The wireless device of claim 20, further comprising:
means for generating system information parameters including the ordered plurality of packages.

29. The wireless device of claim 20, wherein the wireless device is a portable device, further comprising:
means for displaying each package according to the order of each package.

30. A non-transitory computer-readable storage medium having stored thereon software instructions configured to cause a processor to perform operations comprising:
receiving a plurality of packages, at least one package having an associated weight, wherein each package has a set of associated channels; and
ordering the plurality of packages in a list for displaying on a wireless device based on the associated weight.

31. The non-transitory computer readable storage medium of claim 30, wherein the associated weight is an associated channel weight, the computer-readable medium further comprising:
ordering the set of channels for a given package based on the associated channel weight.

32. The non-transitory computer readable storage medium of claim 30, wherein the associated weight is an associated package weight, the computer-readable medium further comprising:
applying a function to a package based on the associated package weight.

33. The non-transitory computer readable storage medium of claim 32, wherein the stored software instructions are configured to cause the processor to perform operations further comprising:
applying a condition to a package based on the associated package weight.

34. The non-transitory computer readable storage medium of claim 30, wherein the associated weight is an associated package weight, the computer-readable medium further comprising:
applying a condition to a package based on the associated package weight.

35. The non-transitory computer readable storage medium of claim 30, wherein the associated weight is an associated channel weight, the computer-readable medium further comprising:
applying a function to a channel based on the associated channel weight.

36. The non-transitory computer readable storage medium of claim 35, wherein the stored software instructions are configured to cause the processor to perform operations further comprising:
applying a condition to a channel based on associated channel weight.

37. The non-transitory computer readable storage medium of claim 30, wherein the stored software instructions are configured to cause the processor to perform operations further comprising:
generating system information parameters including the ordered plurality of packages.

38. The non-transitory computer readable storage medium of claim 30, wherein the associated weight is an associated channel weight and the stored software instructions are configured to cause the processor to perform operations further comprising:
applying a condition to a channel based on the associated channel weight.

39. The non-transitory computer readable storage medium of claim 30, wherein the stored software instructions are configured to cause the processor to perform operating further comprising:
displaying each package according to the order of each package.

* * * * *